US010513202B2

(12) United States Patent
Gumbrich et al.

(10) Patent No.: US 10,513,202 B2
(45) Date of Patent: Dec. 24, 2019

(54) SEAT DEPTH ADJUSTER

(71) Applicants: Adient Luxembourg Holding S.à r.l., Luxembourg (LU); Müller-Technik GmbH, Steinfeld (DE)

(72) Inventors: Markus Gumbrich, Solingen (DE); Christian Klostermann, Holdorf (DE); Joerg Madsen, Rheinberg (DE); René Grahl, Viersen (DE); Ralph Brunner, Krefeld (DE); André Osterhues, Steinfeld-Mühlen (DE)

(73) Assignees: Adient Luxembourg Holding S.à r.l., Luxembourg (LU); Müller-Technik GmbH, Steinfeld (DE)

( * ) Notice: Subject to any disclaimer, the term of this patent is extended or adjusted under 35 U.S.C. 154(b) by 0 days.

(21) Appl. No.: 15/779,330

(22) PCT Filed: Nov. 25, 2016

(86) PCT No.: PCT/EP2016/078818
§ 371 (c)(1),
(2) Date: May 25, 2018

(87) PCT Pub. No.: WO2017/089542
PCT Pub. Date: Jun. 1, 2017

(65) Prior Publication Data
US 2018/0304776 A1  Oct. 25, 2018

(30) Foreign Application Priority Data
Nov. 27, 2015 (DE) .......... 10 2015 223 607
Sep. 20, 2016 (DE) .......... 10 2016 218 014

(51) Int. Cl.
B60N 2/02  (2006.01)
B60N 2/90  (2018.01)

(52) U.S. Cl.
CPC .......... B60N 2/0284 (2013.01); B60N 2/929 (2018.02); *B60N 2002/952* (2018.02)

(58) Field of Classification Search
CPC .............................. B60N 2/0284; B60N 2/929
(Continued)

(56) References Cited

U.S. PATENT DOCUMENTS 6,106,063 A * 8/2000 Dauphin ................ A47C 1/023
                                                          297/284.11 X
6,227,616 B1 * 5/2001 Branke ................ B60N 2/2821
                                                          297/284.11 X
(Continued)

FOREIGN PATENT DOCUMENTS

DE          201 06 560 U1    8/2002
DE    10 2006 018 353 B4     6/2008
EP              353210 A1 *  1/1990

*Primary Examiner* — Rodney B White
(74) *Attorney, Agent, or Firm* — McGlew and Tuttle, P.C.

(57) ABSTRACT

A vehicle seat depth adjuster (1) includes a base plate (2) connectable to a seat structure (17); a detent unit (8); a carrier plate (3) moveably arranged above the base plate; a locking unit (4) detachably engaging the detent unit; and a drive unit (11) moving the carrier plate. The carrier plate is fixed in relation to the base plate in an engaged position of the locking unit and is moveable, between a retracted position and an extended position in a released position of the locking unit by the drive unit. The detent unit is arranged on the upper side (2.5) of the base plate, which faces the carrier plate, and includes receiving elements (8.1) staggered in the direction (L) of movement. The locking unit includes an unlocking lever (5) with at least one locking tooth (5.1) that engages in one of the detent receiving elements in the engaged position.

20 Claims, 21 Drawing Sheets

(58) Field of Classification Search
USPC .................................................. 297/284.11
See application file for complete search history.

(56) References Cited

U.S. PATENT DOCUMENTS

| | | | | |
|---|---|---|---|---|
| 7,874,621 B2* | 1/2011 | Gumbrich | ............ | B60N 2/0284 |
| | | | | 297/284.11 |
| 7,909,401 B2* | 3/2011 | Hofmann | ............ | B60N 2/0284 |
| | | | | 297/284.11 |
| 7,938,488 B2* | 5/2011 | Thiel | .................... | B60N 2/0284 |
| | | | | 297/284.11 |
| 7,997,648 B2* | 8/2011 | Becker | ................ | B60N 2/0284 |
| | | | | 297/284.11 |
| 8,579,373 B2* | 11/2013 | Pradier | ................ | B60N 2/0232 |
| | | | | 297/284.11 |
| 9,016,785 B2* | 4/2015 | Freisleben | ............ | B60N 2/0232 |
| | | | | 297/284.11 |
| 2004/0012231 A1 | 1/2004 | Hesse | | |
| 2007/0108817 A1* | 5/2007 | Lee | ........................ | B60N 2/62 |
| | | | | 297/284.11 |
| 2009/0085387 A1* | 4/2009 | Thiel | .................... | B60N 2/0284 |
| | | | | 297/284.11 |
| 2013/0257126 A1* | 10/2013 | Freisleben | ............ | B60N 2/0232 |
| | | | | 297/311 |
| 2015/0352980 A1* | 12/2015 | Rehfuss | ............... | B60N 2/0232 |
| | | | | 297/284.11 |

\* cited by examiner

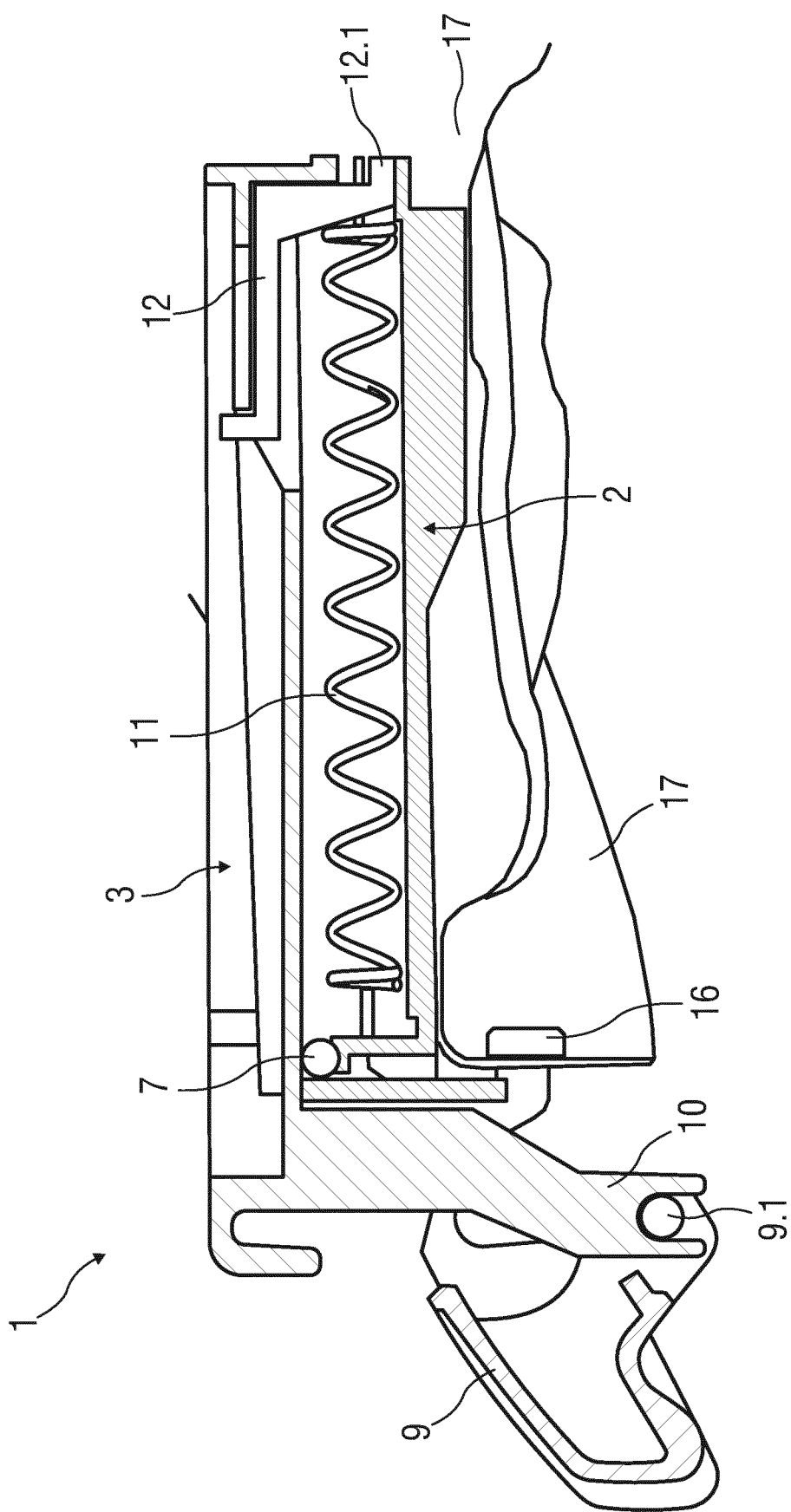

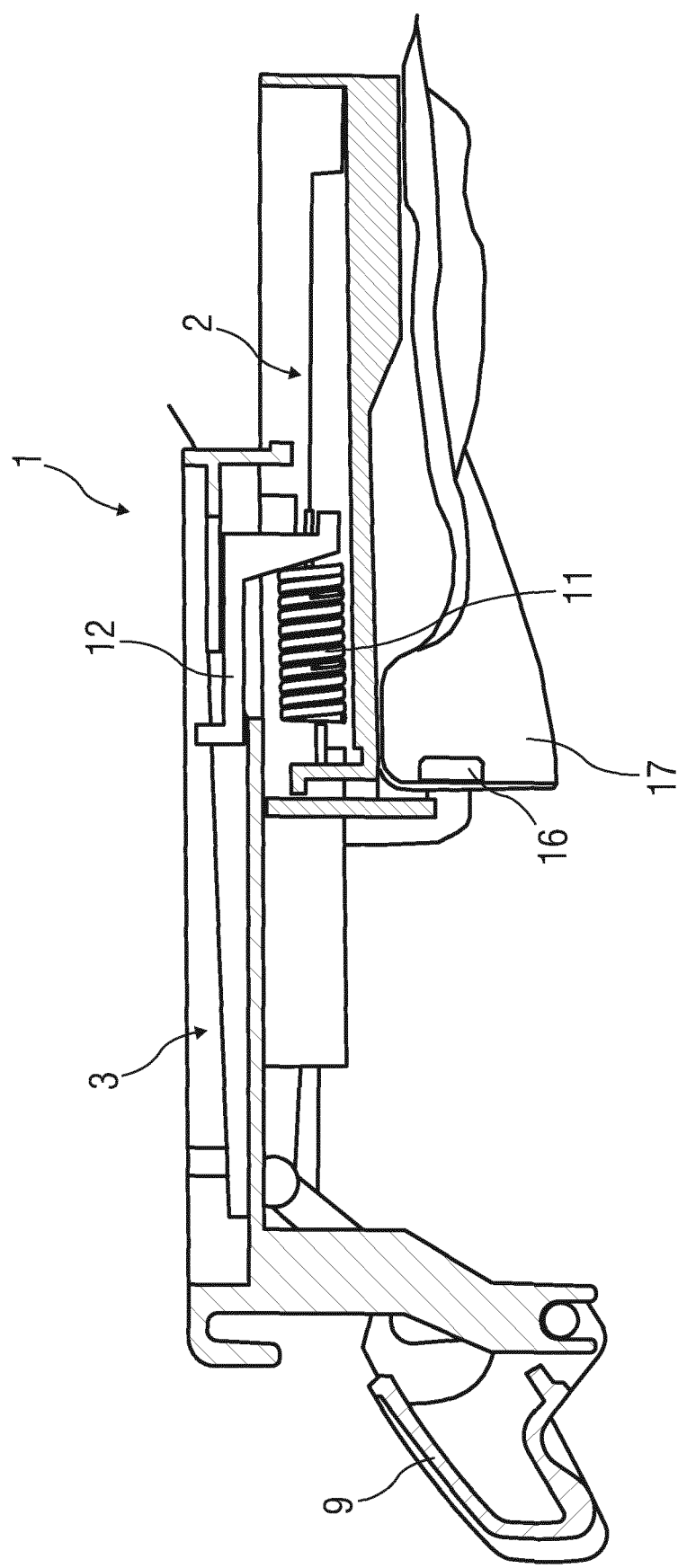

SEAT DEPTH ADJUSTER

CROSS REFERENCE TO RELATED APPLICATIONS

This application is a United States National Phase Application of International Application PCT/EP2016/078818, filed Nov. 25, 2016, and claims the benefit of priority under 35 U.S.C. § 119 of German Applications 10 2015 223 607.2, filed Nov. 27, 2015 and 10 2016 218 014.2, filed Sep. 20, 2016, the entire contents of which are incorporated herein by reference.

FIELD OF THE INVENTION

The invention relates to a seat depth adjuster for a vehicle seat.

BACKGROUND OF THE INVENTION

A device for adjusting the seat depth of a vehicle seat having a seat pan is disclosed in DE 10 2006 018 353 B4, a seat depth adjuster being guided on said seat pan along rail elements, wherein an actuating handle is provided, the seat depth adjuster being releasable thereby. In this case, a rail element comprises a latching tooth, a latching hook with latching elements engaging therein.

SUMMARY OF THE INVENTION

It is an object of the present invention to provide a seat depth adjuster for a vehicle seat, which is improved relative to the prior art, for adjusting the seat depth of a seat surface of the vehicle seat. A further object of the present invention is to provide a method for mounting a seat depth adjuster which is improved relative to the prior art.

A seat depth adjuster according to the invention for a vehicle seat, in particular for adjusting the seat depth of a seat surface of the vehicle seat, comprises a base plate which is connectable to a seat structure of the vehicle seat and which comprises a latching unit and a carrier plate which is arranged above the base plate and which is displaceable relative to the base plate. In other words, the carrier plate, in particular, is movable longitudinally in a direction of displacement and thus expediently in a longitudinal direction of the guide tracks. The seat depth adjuster comprises, moreover, a locking unit which is releasably latched in the latching unit and a drive unit which acts on the carrier plate in the direction of displacement, i.e. in the longitudinal direction. The carrier plate is fixed relative to the base plate in a latched position of the locking unit and is movable, i.e. displaceable, between a retracted position and an extended position in a released position of the locking unit. The drive unit is configured and arranged such that it causes a displacement, i.e. a longitudinal movement, of the carrier plate into the extended position, in the released position of the locking unit. The latching unit is arranged on the upper face of the base plate facing the carrier plate and comprises latching receivers which are offset in the direction of displacement. The locking unit comprises an unlocking lever with at least one locking tooth which engages in one of the latching receivers in a latching manner in the latched position. The unlocking lever is expediently arranged on the carrier plate and thus moves with the carrier plate.

The seat depth adjuster according to the invention thus comprises the base plate and the carrier plate which is movable relative to the base plate, wherein the carrier plate and the base plate in a retracted position are expediently arranged substantially in parallel above one another and are releasably locked together, and wherein after unlocking the carrier plate, said carrier plate is movable relative to the base plate automatically from the retracted position into an extended position. Expediently arranged on the carrier plate is the seat surface or at least one part of the seat surface which, therefore, by the movement of the carrier plate is adjustable in terms of seat depth, i.e. the carrier plate and thus the seat surface or at least one part of the seat surface are movable in the direction of a seat backrest of the vehicle seat or in an opposing direction, i.e. away from the seat backrest. In this case the movement away from the seat backrest, i.e. into the extended position, is assisted by the drive unit. This movement into the extended position, in the case of a vehicle seat oriented in the direction of travel in a vehicle, takes place in the direction of travel, i.e. in the X-direction of a three-dimensional coordinate system.

A vehicle seat according to the invention comprises such a seat depth adjuster.

The advantages achieved by the invention are, in particular, that a user is able to enlarge the seat depth of the seat surface in a simple and rapid manner merely by unlocking the carrier plate fastened to the seat surface. By the arrangement according to the invention of the latching unit and the locking unit, in particular by an unlocking permitted thereby by a movement of the unlocking lever such that the at least one locking tooth is moved upwardly out of the respective latching receiver, and for locking is moved downwardly into the respective latching receiver, a secure latching, i.e. a secure locking, of the seat depth adjuster and, in particular, an improved behavior is achieved in vehicle accident situations in which a vehicle seat is arranged with such a seat depth adjuster. In particular, as a result, the risk of uncontrolled and inadvertent unlocking due to an accident and a resulting uncontrolled and inadvertent seat depth adjustment during the accident, associated with a corresponding risk of injury to a vehicle occupant on the vehicle seat, is considerably reduced. In contrast to the solution according to the invention, in the seat depth adjuster known from the prior art, by the lateral arrangement of the latching unit and the locking unit and by the resulting lateral, i.e. horizontal, movement for locking and unlocking, in particular in the case of side impact collisions, in comparison with the solution according to the invention, a greater risk is present of an, in particular, uncontrolled and inadvertent unlocking due to an accident and a resulting uncontrolled and inadvertent seat depth adjustment during the accident.

In order to permit the unlocking by moving the at least one locking tooth upwardly out of the respective latching receiver and the locking by moving the at least one locking tooth downwardly into the respective latching receiver, the latching receivers are expediently open upwardly and the at least one locking tooth is expediently oriented downwardly. In other words, the locking tooth is expediently arranged on the unlocking lever such that a free end of the at least one locking tooth is arranged below the other opposing end region of the locking tooth, by which the locking tooth is arranged or configured on the unlocking lever, expediently in an end region of the unlocking lever.

Expediently, the seat depth adjuster comprises at least one resetting element which acts on the locking unit toward the latched position. This resetting element expediently acts directly on the unlocking lever. By means of the resetting element, the unlocking lever is held, in particular pressed, in the locked position. For example, the resetting element is configured as a spring, in particular as a compression spring or for example as a tension spring. The resetting element expediently acts directly on the end region of the unlocking lever, the at least one locking tooth being arranged or configured thereon. By this direct action on the unlocking lever, the secure latching of the at least one locking tooth is ensured in the respective latching receiver and thus, in particular, an inadvertent seat depth adjustment is avoided. In this case, by the direct action on the unlocking lever a tolerance chain is shortened. If the resetting element were to act on other components connected to the unlocking lever and only indirectly on the unlocking lever via these components, tolerances which accumulate could be produced and then a complicated transmission of force would additionally be required, resulting in the risk that due to these tolerances and the complicated transmission of force to the unlocking lever the action of the force of the resetting element would no longer be sufficient in order to keep the locking tooth securely in the locked position in the respective latching receiver. This is avoided by the direct action of the resetting element on the unlocking lever.

The unlocking lever is expediently coupled to an actuating unit, the unlocking lever being actuatable and as a result movable thereby between the latched position and the released position. Particularly preferably, the unlocking lever is directly coupled to the actuating unit, i.e. without further components arranged therebetween for the transmission of force from the actuating unit to the unlocking lever. For example, the unlocking lever is coupled in articulated manner to the actuating unit and, as a result, movable between the latched position and the released position. By this, in particular, direct coupling the seat depth adjuster is of particularly simple configuration. A direct unlocking is possible and a complex lever deflection via a plurality of components arranged between the unlocking lever and the actuating unit is avoided. As a result, moreover, fewer components are required. Due to the small number of components, for example, only the unlocking lever and the actuating unit acting thereon are required for the actuation, in other words in particular for the unlocking, a small tolerance chain is achieved and thus a fine adjustment of the components engaging in one another, i.e. the components cooperating for the unlocking and locking, is possible. Additionally, by the reduced number of components the seat depth adjuster has a correspondingly lower weight and a correspondingly lower spatial requirement and the costs for the seat depth adjuster are reduced.

The actuating unit and the unlocking lever are expediently configured and arranged such that for moving the unlocking lever the actuating unit acts on an end region of the unlocking lever remote from the at least one locking tooth. As a result, the direct actuation of the unlocking lever and an optimal lever action are achieved.

The unlocking lever is expediently pivotably mounted about an axle. By the action of the actuating unit for unlocking, therefore, the end region of the unlocking lever remote from the at least one locking tooth is forced substantially downwardly, whereby the unlocking lever is pivoted about the axle and the other end region of the unlocking lever comprising the at least one locking tooth is pivoted upwardly out of the respective latching receiver.

The actuating unit, for example the actuating handle, is for example pivotably mounted such that the action thereof on the unlocking lever takes place in the form of an elliptical guide. The unlocking is implemented thereby in a forcibly guided curved track.

The main advantage of the disclosed locking of the seat depth adjuster which is unlocked upwardly, i.e. by moving the at least one locking tooth upwardly out of the respective latching receiver, and is locked again downwardly, i.e. by moving the at least one locking tooth downwardly into the respective latching receiver, is the optimized behavior during an accident, i.e. during a collision of the vehicle with an obstacle. Particularly preferably, the at least one locking tooth and the latching receivers are configured, for example, by an undercut on one side, such that an automatic unlocking and retraction of the seat depth adjuster, i.e. a displacement of the carrier plate into the retracted position is permitted, but exclusively into the retracted position. In other words, if the carrier plate were to be moved in the opposing direction, the at least one locking tooth would immediately be latched again. Since, therefore, during an accident an automatic, deliberate and controlled displacement of the carrier plate is possible into the retracted position, for example, and an inadvertent and uncontrolled displacement into the extended position is prevented, the risk of injury is reduced. The at least one locking tooth and the latching receivers, therefore, expediently have such a tooth geometry and the seat depth adjuster is expediently configured such that, in particular, in the case of a rear-end collision due to a resulting defined force introduction via the vehicle occupants, the deliberate and controlled automatic unlocking and retraction of the seat depth adjuster, i.e. the deliberate and controlled displacement of the carrier plate into the retracted position, is possible. In the seat depth adjuster known from the prior art which has the lateral arrangement of the latching unit and the locking unit and the resulting lateral, i.e. horizontal, movement for locking and unlocking, this is not provided and is also not possible.

By the above-described arrangement of the unlocking lever on the carrier plate and, therefore, in particular above the base plate, for example, it is possible to carry out repairs or dismantling in a particularly simple manner. For example, to this end only the seat part has to be removed from the carrier plate. The unlocking lever is, for example, at least partially arranged in a recess in the carrier plate and, therefore, accessible from above, i.e. from an upper face of the carrier plate, and may as a result be easily dismantled or repaired, for example in the case of wear of the locking tooth. For example, the unlocking lever is arranged on the upper face of the carrier plate and the at least one locking tooth pivots through the recess in the carrier plate. For example, in this case regions of the unlocking lever also pivot through this recess. The unlocking lever may also be arranged in the recess and, in the locked state with the end region on which the at least one locking tooth is arranged, may be oriented downwardly in the direction of the base plate and for unlocking may pivot upwardly into the recess of the carrier plate. In a further embodiment, the unlocking lever may also be arranged on a lower face of the carrier plate facing the base plate. Thus for the dismantling or repair of the unlocking lever, for example, it is necessary to remove the carrier plate from the base plate.

By the above-described direct action of the actuating unit on the unlocking lever a haptic sensation, i.e. an actuating sensation, during the unlocking is improved. A comfortable, customer-friendly fine adjustment with regard to an unlocking pressure point is possible. A safe, comfortable and simple operation is possible. The locking and, in particular, the unlocking, require only a small amount of force expenditure. Simple mounting is permitted and only a low material expenditure is required.

The drive unit expediently comprises at least one spring element which is tensioned between the base plate and the carrier plate. In other words, in one possible embodiment in the retracted position the base plate and the carrier plate are pretensioned, held relative to one another and locked by means of at least one drive element, in particular a spring element. By unlocking the carrier plate from the base plate, the drive element is released and the carrier plate moves relative to the base plate automatically into the extended position. In particular, with a drive unit configured as a spring element, this drive unit is relieved of tension. In this case, one or more spring elements may be provided as the drive unit. The spring element is, for example, a tension spring. Alternatively, the spring element may be a compression spring.

The seat depth adjuster has a simple construction.

The seat depth adjuster comprises the base plate and the carrier plate which is movable relative to the base plate, wherein the base plate is fastened or is fastenable to the seat structure. For positioning the base plate on the seat structure, the seat depth adjuster preferably comprises at least two domes which expediently protrude vertically from the lower face of the base plate. The domes are expediently configured so as to correspond to the seat structure and are positioned on the base plate. Fastening with zero backlash is expediently carried out by a retrospective fastening of the base plate and seat structure, for example by means of a screw fastening. To this end, the base plate expediently comprises through-bores for receiving fastening elements, for example screws, for fixing the base plate to the seat structure.

In a method for mounting the seat depth adjuster according to the invention, in a first step the base plate is positioned onto the seat structure in the vertical Z-direction and pre-positioned by means of the domes and in a second step the base plate is fixed by the fastening elements to the seat structure. The domes which expediently comprise deformable ribs permit a simple, rapid and accurate pre-positioning with zero backlash for the subsequent screw connection. As a result, the mounting sequence is optimized and the mounting time reduced. The above-mentioned Z-direction refers to a three-dimensional coordinate system. In a vehicle seat already positioned in the vehicle, this corresponds to the direction of a vertical axis of the vehicle, whilst the X-direction corresponds to the direction of a longitudinal axis of the vehicle and thus the direction of travel and the Y-direction corresponds to the direction of a transverse axis of the vehicle when the vehicle seat is positioned in the direction of travel.

Exemplary embodiments of the invention are described in more detail with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a schematic view sectional view of a seat depth adjuster in the unlocked state and in the retracted state in the region of a spring element;

FIG. 7 is a schematic sectional view of a seat depth adjuster in the unlocked state and in the retracted state in the region of a spring element;

DESCRIPTION OF THE PREFERRED EMBODIMENTS

Figure 1:
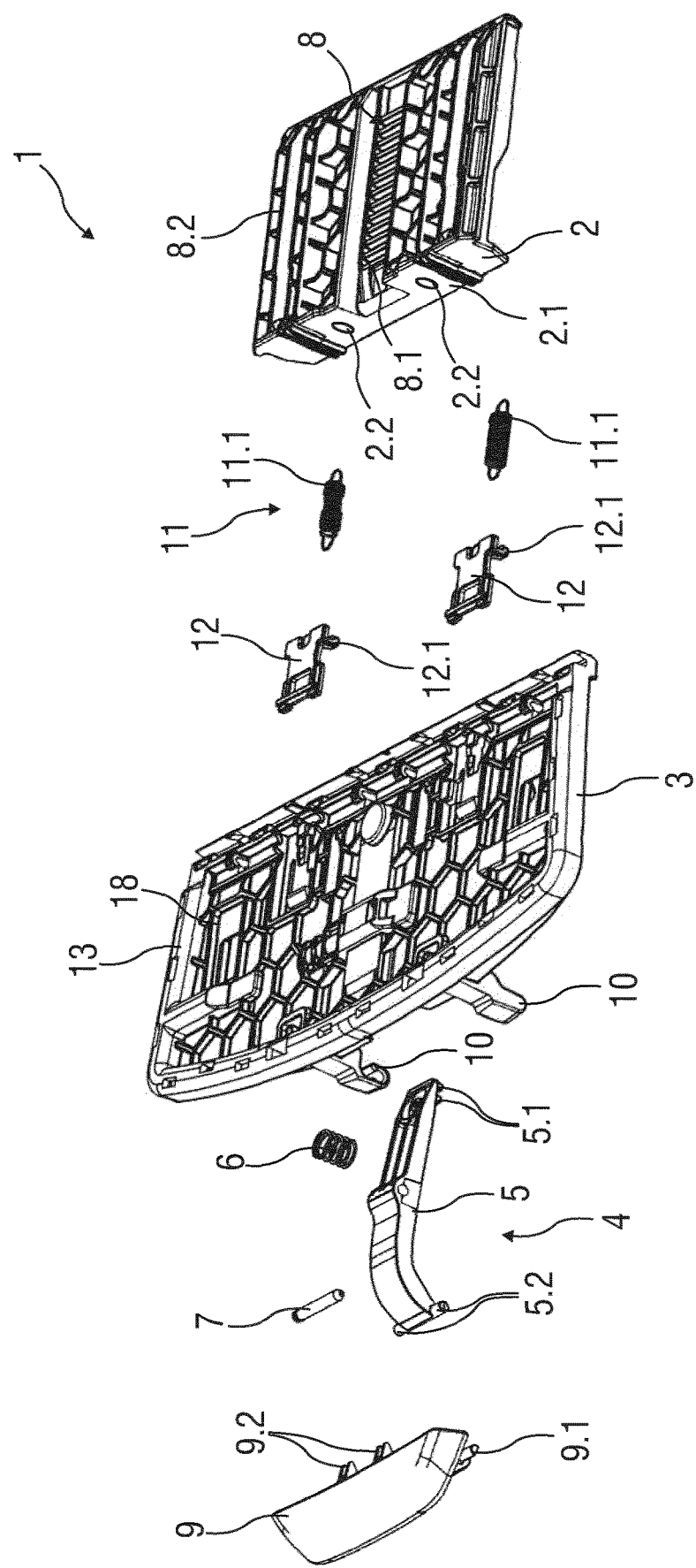
FIG. 1 is a schematic exploded view showing a seat depth adjuster.

Referring to the drawings, parts which correspond to one another are provided in all of the figures with the same reference numerals.

FIG. 1 shows schematically in an exploded view a seat depth adjuster 1 for a seat surface of a vehicle seat. The seat depth adjuster 1 in this case serves for lengthening or shortening the seat surface of the vehicle seat.

To this end, the seat depth adjuster 1 comprises a base plate 2 and a carrier plate 3 which is movable, in particular displaceable, relative to the base plate 2. The carrier plate 3 and the base plate 2 are releasably lockable relative to one another. To this end, the seat depth adjuster 1 comprises a locking unit 4.

The locking unit 4 comprises at least one unlocking lever 5. The unlocking lever 5 is configured in the form of a rocker which is rotatably mounted about an axle 7. Moreover, the locking unit 4 comprises at least one resetting element 6. By means of the resetting element 6 the unlocking lever 5 is held, in particular pressed, in a locked position. To this end, the resetting element 6 is configured in the form of a compression spring.

For locking the unlocking lever 5 in the locked position, said unlocking lever comprises at least one locking tooth 5.1 which engages in a latching manner in a latching unit 8 in the base plate 2. In the exemplary embodiment shown according to FIG. 1, the unlocking lever 5 comprises two locking teeth 5.1, at least one thereof engaging in a latching manner in a latching receiver 8.1, for example in a latching groove, of the latching unit 8. In the other exemplary embodiments, for example according to FIGS. 2A to 8C, the unlocking lever 5 comprises, for example, only one locking tooth 5.1.

An actuating unit 9 is provided for actuating the seat depth adjuster 1. The actuating unit 9 is designed as a lever or handle which, for example, is pivotably mounted by means of pins 9.1 on a bearing 10 of the carrier plate 3.

The base plate 2 also comprises a ribbed portion 8.2.

The actuating unit 9 is also pivotably and movably coupled to the unlocking lever 5 for the actuation thereof, in particular the unlocking of the seat depth adjuster 1. To this end, the actuating unit 9 comprises arms 9.2 which are coupled in an articulated manner to lever ends 5.2 which are remote from the locking tooth 5.1 or from the locking teeth 5.1. In the exemplary embodiments according to FIGS. 2A to 9, these lever ends 5.2 are configured in a fork-shaped manner, i.e. a lever end 5.2 which spreads apart in the manner of a fork is configured remote from at least one locking tooth 5.1.

In the assembled state the base plate 2 and the carrier plate 3 in a retracted position are arranged one above the other and locked by means of the locking unit 4. For unlocking the carrier plate 3 from the base plate 2, the actuating unit 9 is actuated and the locking unit 4 is released.

For the automatic extension of the carrier plate 3 relative to the base plate 2 after unlocking the locking unit 4, the seat depth adjuster 1 comprises a drive unit 11. The drive unit 11 is configured, for example, as one or more spring elements 11.1. In particular, the drive unit 11 is configured as a tension spring which in the retracted state of the carrier plate 3 holds this carrier plate in a pretensioned state relative to the base plate 2. After unlocking the locking unit 4 the tension spring is relieved of tension and moves, in particular pulls, the carrier plate 3 forward beyond the base plate 2.

In an alternative embodiment, a compression spring may be provided instead of a tension spring.

Moreover, the seat depth adjuster 1 comprises two pushing elements 12, the carrier plate 3 being displaceably fastenable thereby to a seat structure 17 of the vehicle seat.

Figure 2A:
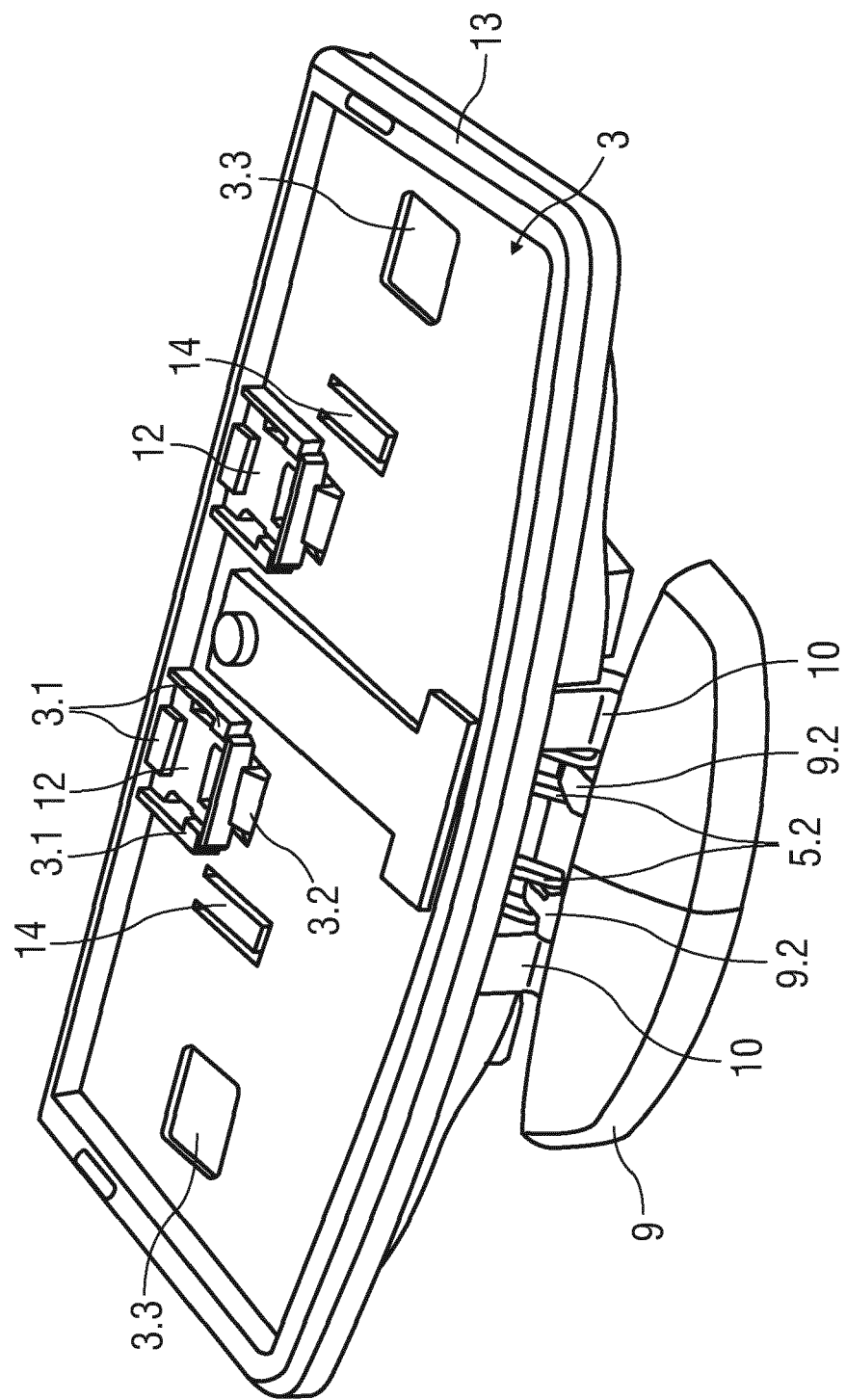
FIG. 2A is a schematic perspective view from above a carrier plate with an actuating handle.
Figure 2B:
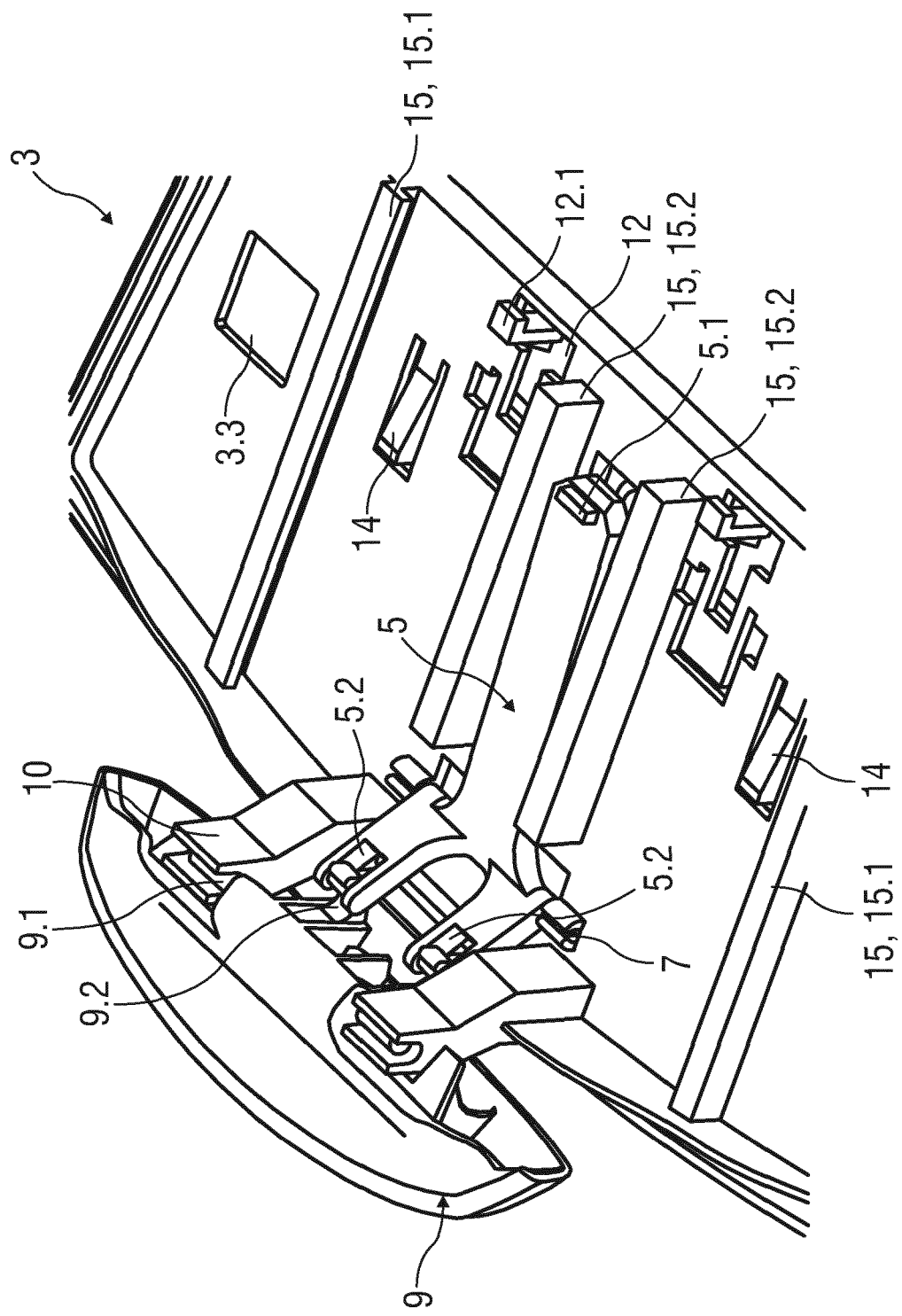
FIG. 2B is a schematic perspective view from below the carrier plate with the actuating handle.

FIGS. 2A and 2B show schematically in a perspective view from above and from below a carrier plate 3 with an actuating unit 9 which is configured as an actuating handle and which is pivotably and movably coupled to the unlocking lever 5 in the manner of an articulated coupling.

The pushing elements 12 are fixed to the carrier plate 3. For example, the pushing elements 12 are fixed by means of clips 3.1 to the carrier plate 3, as shown in FIG. 2A. For simple mounting of the pushing elements 12, each pushing element 12 is provided with three clips 3.1 which fix the pushing element 12 from three sides and at the top. Toward the open side in each case a stop 3.2 is provided, said stop preventing a release of the pushing elements 12 inserted in the clips 3.1.

The carrier plate 3 has a peripheral edge 13. Moreover, the carrier plate 3 has two recesses 3.3. Additionally, the carrier plate 3, as shown in FIG. 1, may have a ribbed structure 18 on the surface side.

The unlocking lever 5 has in the direction of the actuating unit 9 fork-shaped lever ends 5.2, the arms 9.2 of the actuating unit 9 engaging therein and being coupled together in an articulated manner, in particular rotatably and pivotably coupled together. The end region remote from the at least one locking tooth 5.1, in this case with the two fork-shaped lever ends 5.2, is expediently angled relative to the other end region of the unlocking lever 5 on which the at least one locking tooth 5.1 is positioned, in particular in the direction of a movement arrow B, so that a simpler coupling of the unlocking lever 5 to the actuating unit 9 and a simpler actuating movement of the actuating unit 9 and the transmission thereof to the unlocking lever 5 is possible.

The hooks 12.1 protruding vertically from the pushing elements 12 are shown in FIG. 2B, said hooks passing downwardly through the carrier plate 3. One end of the respective spring element 11.1 is fastened to the hooks 12.1.

The carrier plate 3 further comprises downwardly facing stop arms 14. The stop arms 14 may be designed flexibly and in the form of latching hooks. Moreover, the stop arms 14 may be engaged in a latching manner in a predetermined position.

Moreover, the carrier plate 3 on its lower face comprises a number of guide elements 15. The two outer guide elements 15.1 are configured as L-shaped profiles. The two inner guide elements 15.2 are configured as square profiles.

Figure 3:
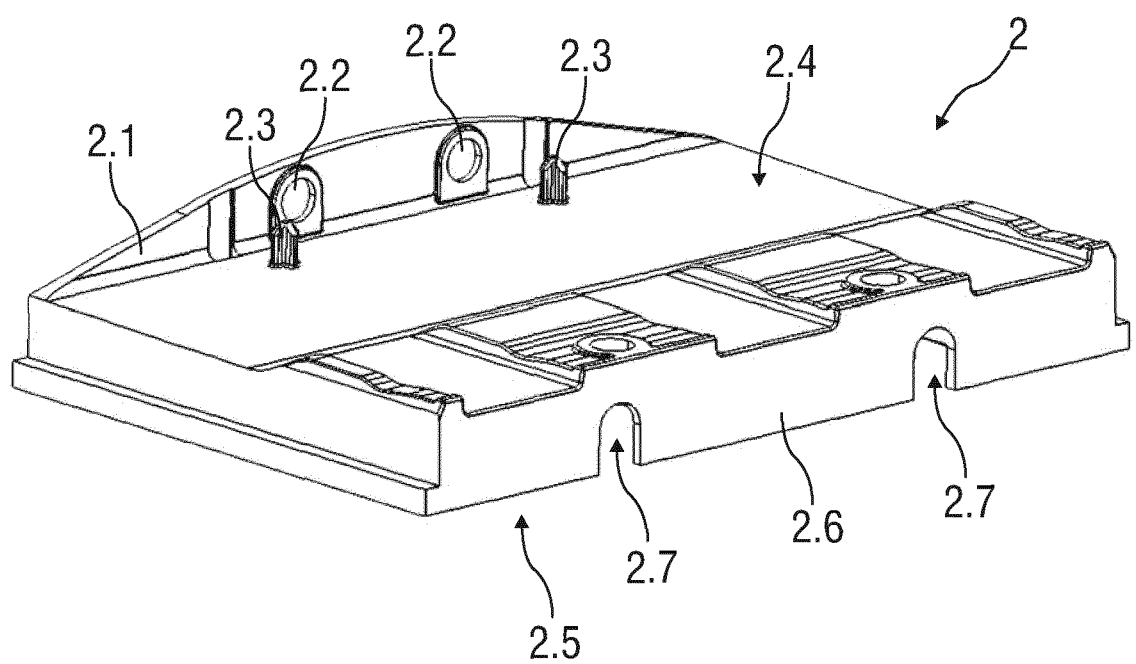
FIG. 3 is a perspective view of a base plate.

FIG. 3 shows in a perspective view from below an embodiment of a base plate 2. The base plate 2 has on its lower face 2.4 for fastening to a seat structure 17 a vertically protruding wall 2.1 with two through-bores 2.2 The through-bores 2.2 serve for receiving fastening means such as screws, rivets or clips.

For pre-positioning the base plate 2 onto the seat structure 17 the base plate 2 comprises on the lower face 2.4 two vertically protruding domes 2.3.

On the upper face 2.5 opposing the lower face 2.4, the base plate 2 comprises at least in sections a vertically protruding edge 2.6. The edge 2.6 on the upper face 2.5 which opposes the wall 2.1 on the lower face 2.4 comprises two recesses 2.7. In the assembled state, the hooks 12.1 are guided through these recesses 2.7.

Figure 4:
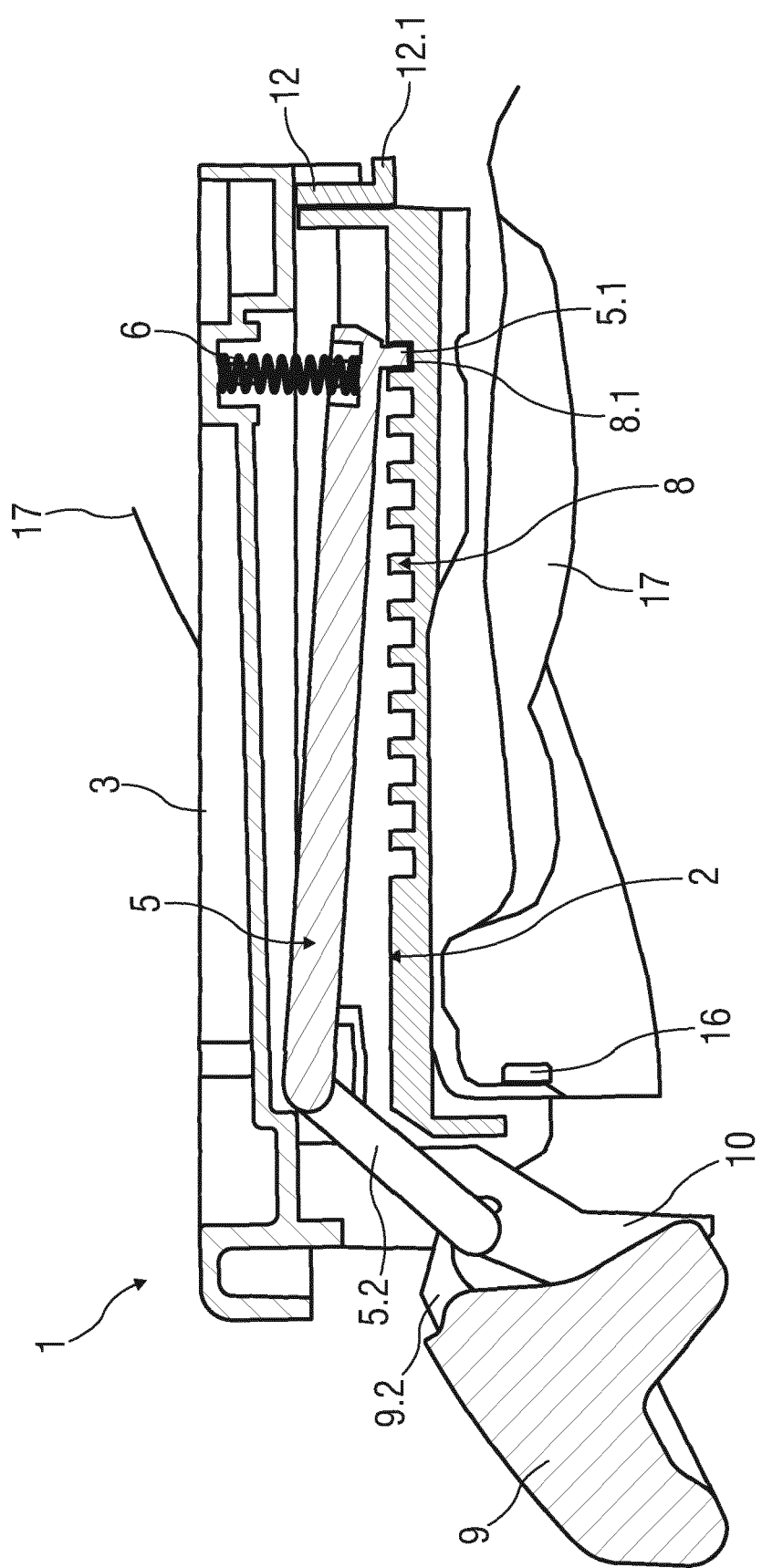
FIG. 4 is a schematic sectional view of a seat depth adjuster in the locked state and in the retracted state.

FIG. 4 shows schematically in a sectional view the seat depth adjuster 1 in the locked state and in the retracted state. The seat depth adjuster 1 is fastened by means of screws 16 to a seat structure 17. In this retracted state the base plate 2 and the carrier plate 3 are arranged one above the other. The unlocking lever 5 is held by means of the resetting element 6 in a locked position in one of the latching receivers or grooves 8.1.

Figure 5:
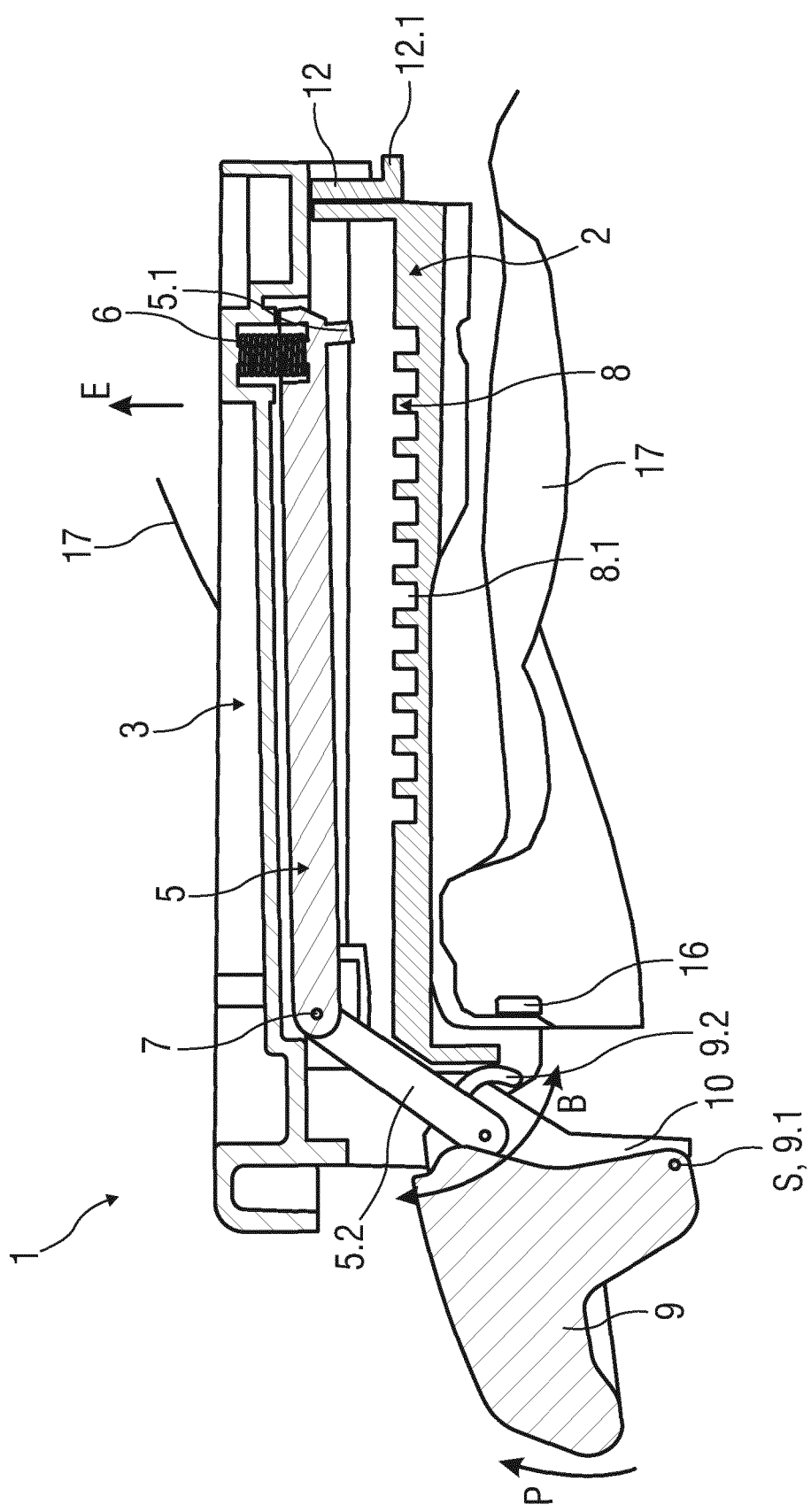
FIG. 5 is a schematic sectional view of a seat depth adjuster in the unlocked state and in the retracted state in the region of an actuating handle.

FIG. 5 shows schematically in a sectional view the seat depth adjuster 1 in the unlocked state and also in the retracted state in the region of the unlocking lever 5.

For actuating the seat depth adjuster 1 the actuating unit 9 is pivoted upwardly according to the arrow P about the pivot axis S. By the articulated coupling of the actuating unit 9 and the unlocking lever 5, when the actuating unit 9 is actuated the unlocking lever 5 is pivoted about the axle 7 since the lever ends 5.2 are moved by the action of the actuating unit 9 according to the movement arrow B, so that the other lever end with the locking tooth 5.1 according to the unlocking movement E is moved upwardly out of the latching receiver 8.1 and the seat depth adjuster 1 is unlocked.

FIG. 6 shows schematically in a sectional view the seat depth adjuster 1 in the unlocked state and also in the retracted state in the region of the drive unit 11. The drive unit 11 is configured as a tension spring and pretensions the carrier plate 3 relative to the base plate 2 in the retracted state. By releasing the unlocking lever 5 from the locked position, the carrier plate 3 is automatically moved to the front into the extended position which is shown in FIG. 7. To this end, the tension spring is relieved of tension.

For locking the carrier plate 3 in the extended position in one of the latching receivers 8.1, the actuating unit 9 is released, whereby the handle is moved downwardly into the initial position and the unlocking lever 5 and the locking tooth 5.1 thereof drops down into one of the latching receivers 8.1 of the base plate 2 (similar to the locking in the retracted position, as shown in FIG. 4).

FIG. 7 shows the seat depth adjuster 1 in the extended state in which the carrier plate 3 is extended relative to the base plate 2. In this case the spring element 11.1 is relieved of tension.

FIGS. 8A to 8H show the mounting sequence for a seat depth adjuster 1.

Figure 8A:
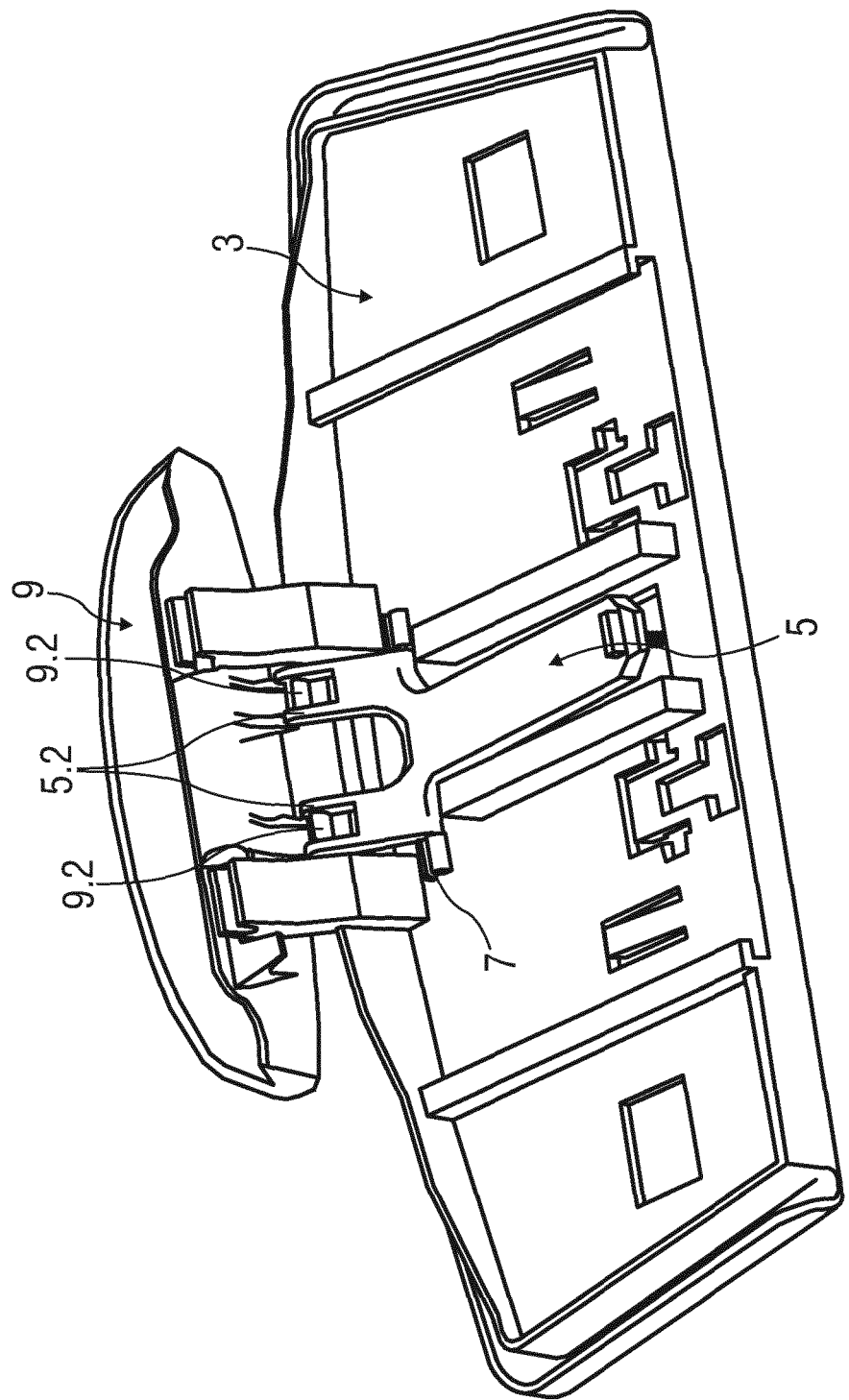
FIG. 8A is a schematic view showing a stage of a mounting sequence for a seat depth adjuster.

In this case, as shown in FIG. 8A, initially the actuating unit 9 and the unlocking lever 5 are fastened to the carrier plate 3 (also called the cover).

Figure 8B:
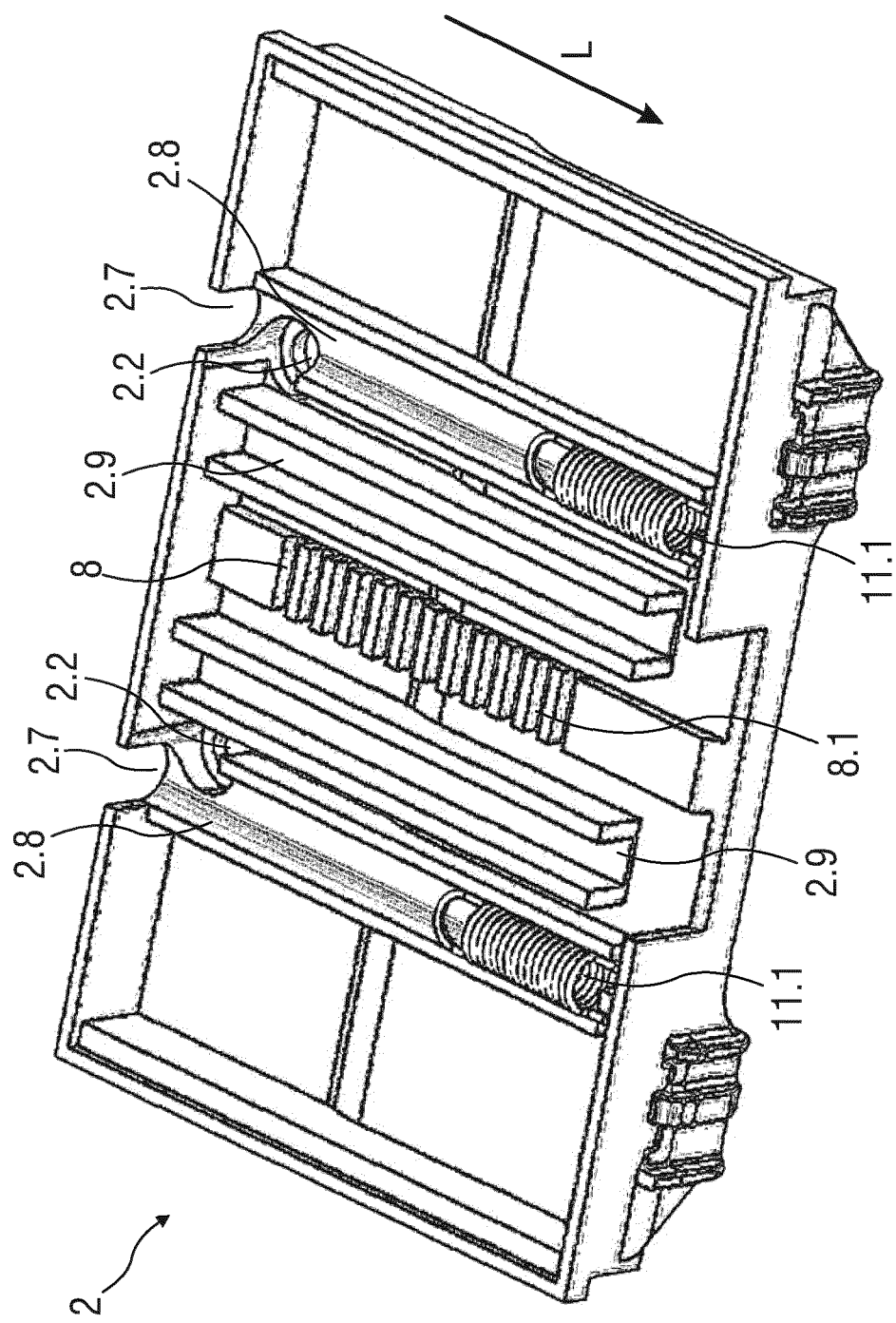
FIG. 8B is a schematic view showing another stage of the mounting sequence for a seat depth adjuster.

According to FIG. 8B, therefore, the spring elements 11.1 are arranged in the base plate 2. To this end, the base plate 2 comprises two guide tracks 2.8 arranged in a longitudinal direction, i.e. in a direction of displacement L, the spring elements 11.1 being arranged therein. In this case, a spring end is fastened to the base plate 2, for example hooked in or clipped.

For fastening the base plate 2 to the seat structure 17 the through-bores 2.2 are provided in the bottom of the base plate 2 instead of in a front wall 2.1, as shown in FIGS. 1 and 3.

Two further guide tracks 2.9 arranged in the longitudinal direction, i.e. in the direction of displacement L, serve for receiving the guide elements 15.2 of the carrier plate 3.

Figure 8C:
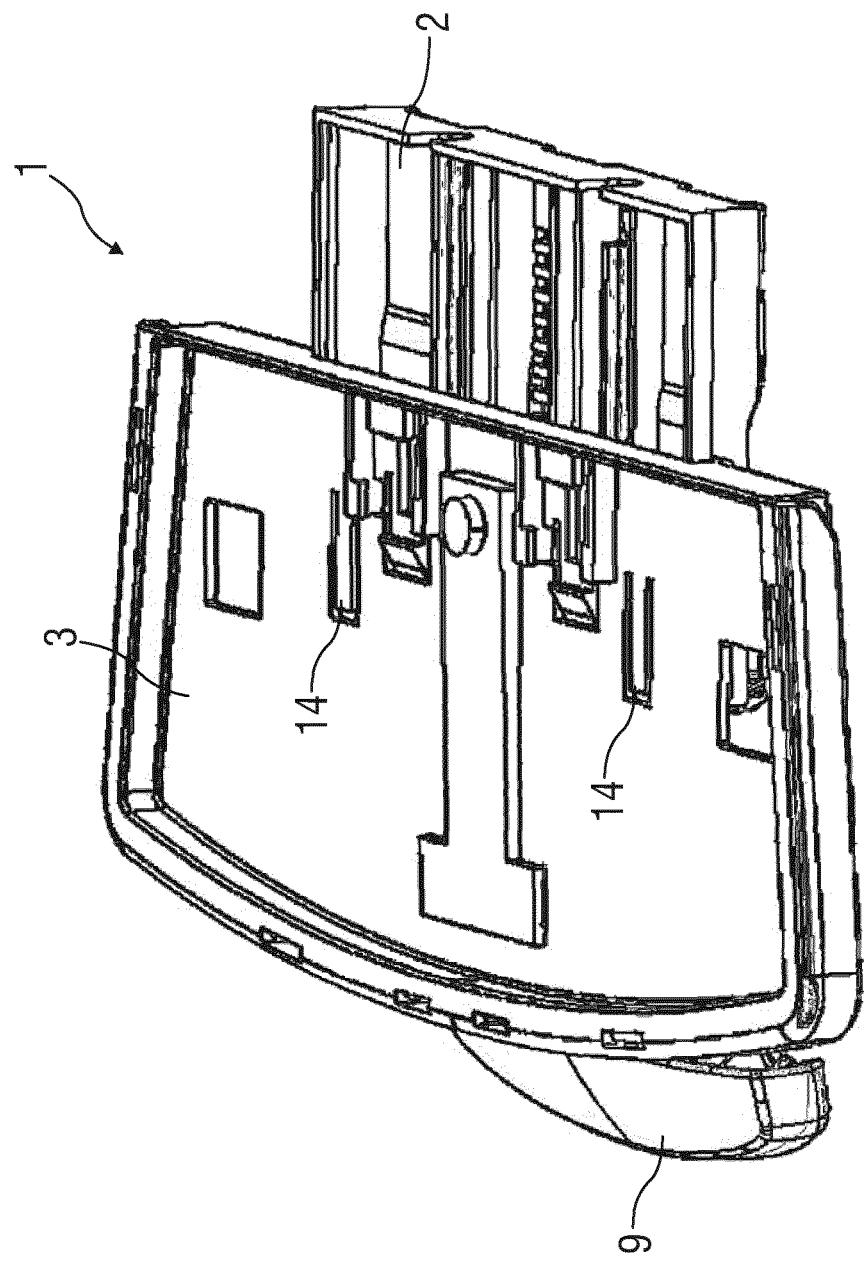
FIG. 8C is a schematic view showing another stage of the mounting sequence for a seat depth adjuster.

Subsequently, the carrier plate 3 is positioned on the base plate 2 in the extended position, and partially retracted until the stop arms 14 are latched to the base plate 2, as shown in FIG. 8C.

Figure 8D:
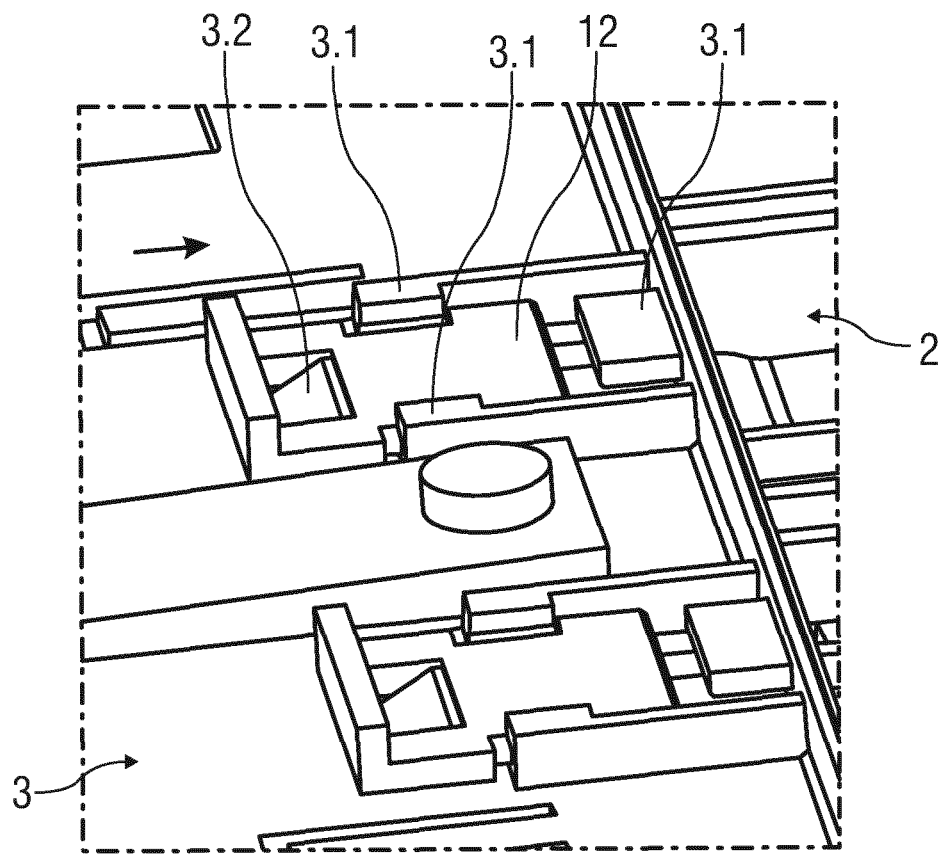
FIG. 8D is a schematic view showing another stage of the mounting sequence for a seat depth adjuster.

In the next step the two pushing elements 12 on the carrier plate 3 are pushed into their end position below the clips 3.1 and latched as shown in FIG. 8D. The stop 3.2 is configured as a latching stop in this embodiment.

Figure 8E:
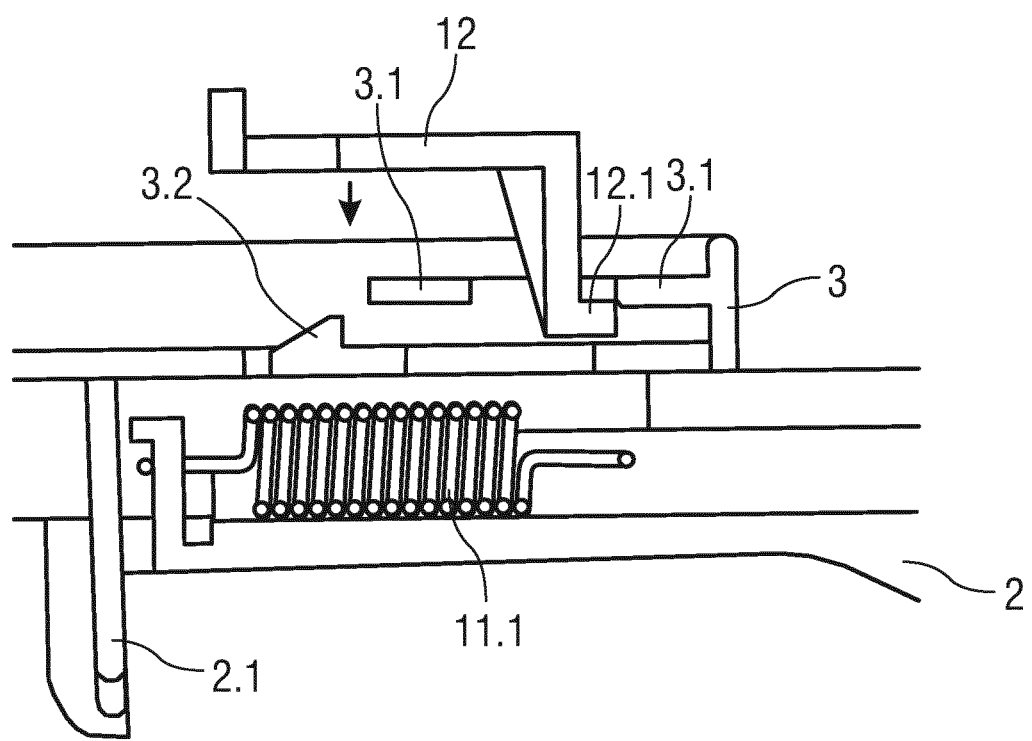
FIG. 8E is a schematic view showing another stage of a mounting sequence for a seat depth adjuster.
Figure 8F:
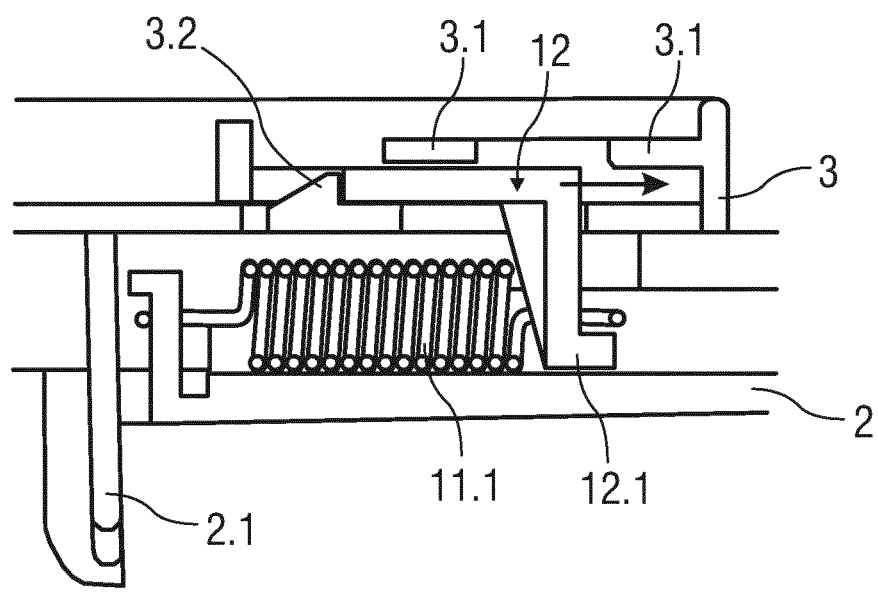
FIG. 8F is a schematic view showing another stage of the mounting sequence for a seat depth adjuster.

FIG. 8E shows in this case a partial mounting step of the pushing element 12 which is initially positioned from above onto the carrier plate 3. In this case, the hook 12.1 engages in the free spring end of the spring element 11.1, as is shown in FIG. 8F.

Figure 8G:
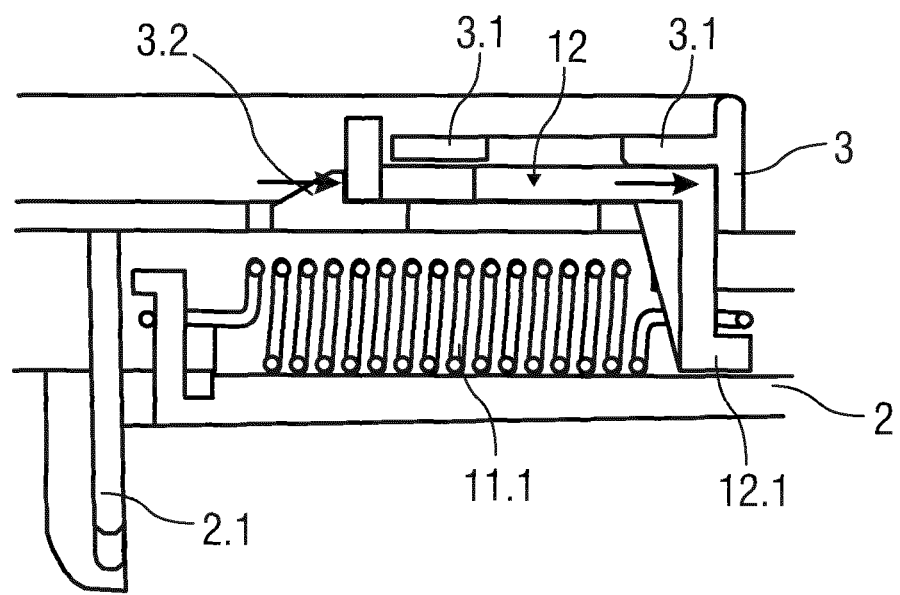
FIG. 8G is a schematic view showing another stage of the mounting sequence for a seat depth adjuster.

FIG. 8G shows how the pushing element 12 is subsequently pushed relative to the carrier plate 3 into the end position until the pushing element 12 is fastened in a latched manner to the carrier plate 3. By pushing the pushing element 12 into its end position, the spring element 11.1 is partially pretensioned.

Figure 8H:
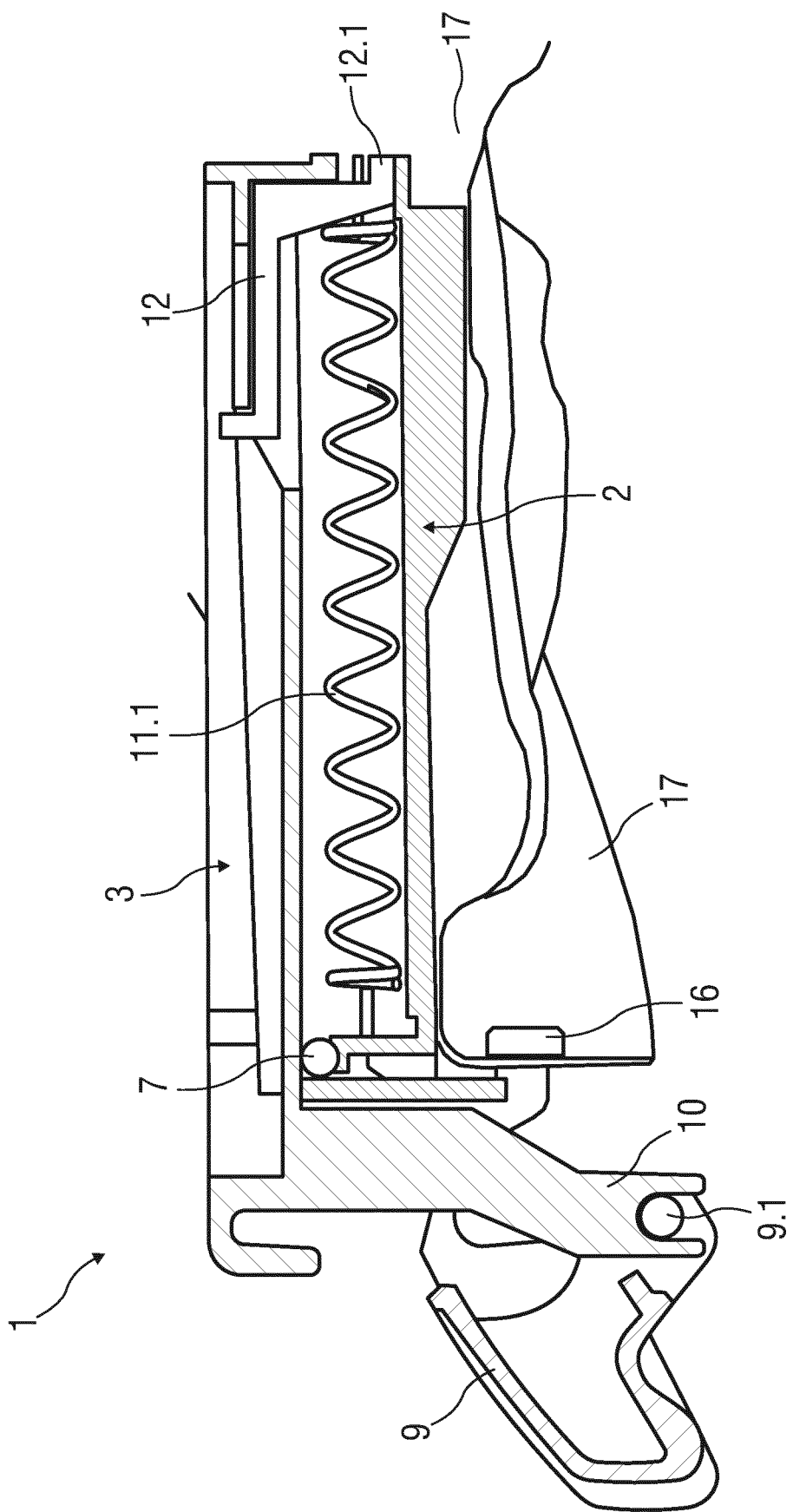
FIG. 8H is a schematic view showing another stage of the mounting sequence for a seat depth adjuster.

FIG. 8H shows how the carrier plate 3 is subsequently pushed relative to the base plate 2 into the retracted position, whereby the spring element 11.1 is tensioned.

Figure 9:
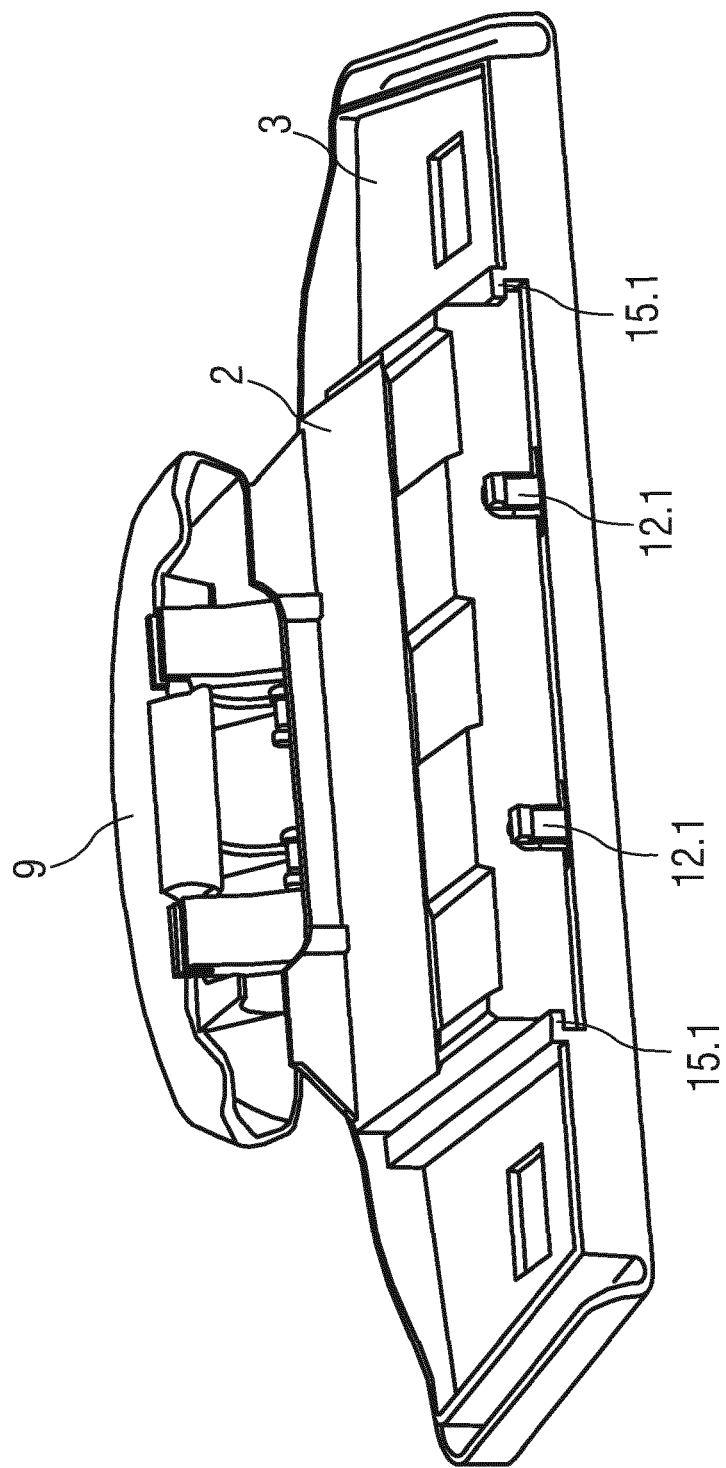
FIG. 9 is a schematic view of a partially mounted seat depth adjuster with a carrier plate and actuating unit mounted thereon and/or base plate mounted thereon.
Figure 10:
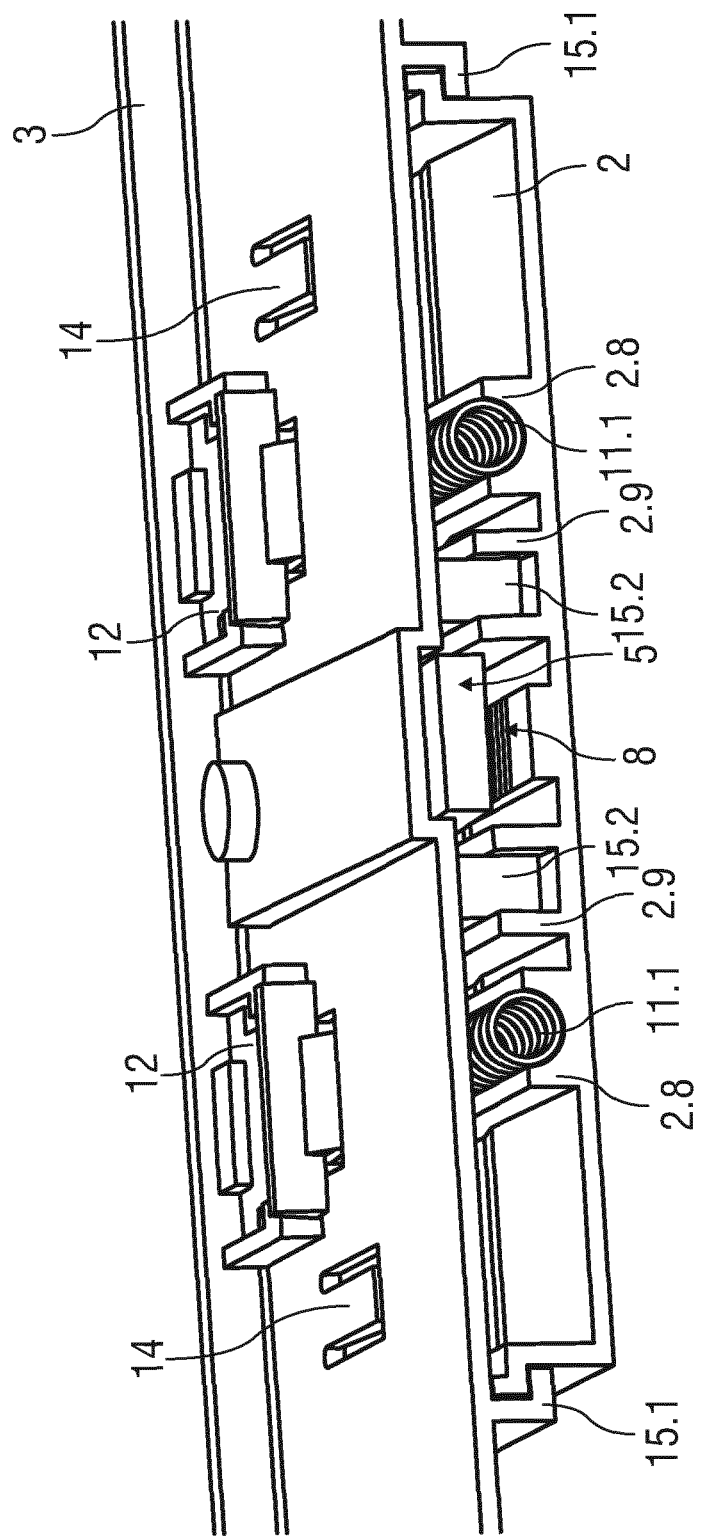
FIG. 10 is a schematic view of a partially mounted seat depth adjuster with a carrier plate and actuating unit mounted thereon and/or base plate mounted thereon.

FIGS. 9 and 10 show the seat depth adjuster 1 in the assembled state and in the retracted state of the carrier plate 3 relative to the base plate 2. In this case, the outer guide elements 15.1, which are configured as L-shaped profiles, and the inner guide elements 15.2 are provided for guiding the carrier plate 3 on the base plate 2.

Figure 11:
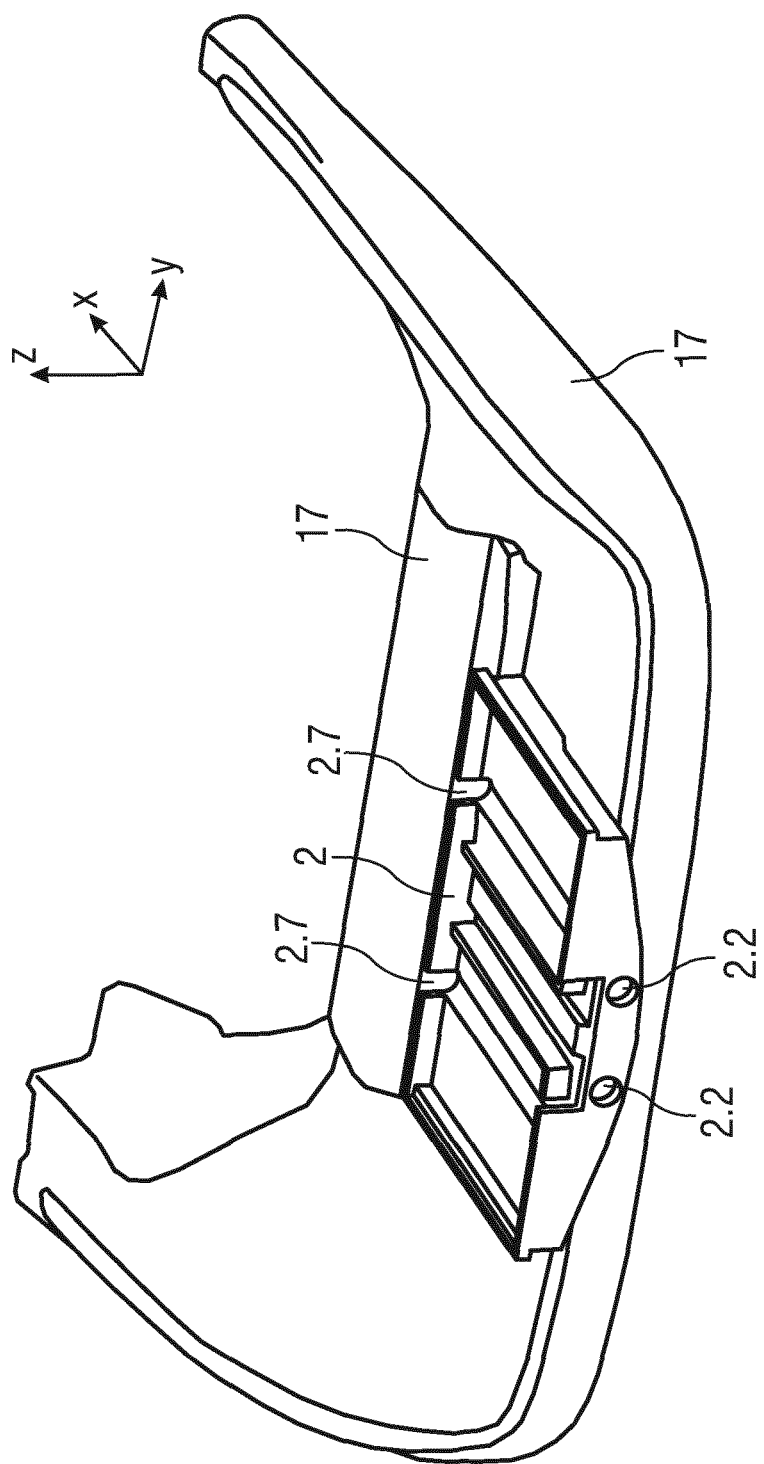
FIG. 11 is a schematic view of a partially mounted base plate on a seat structure.
Figure 12:
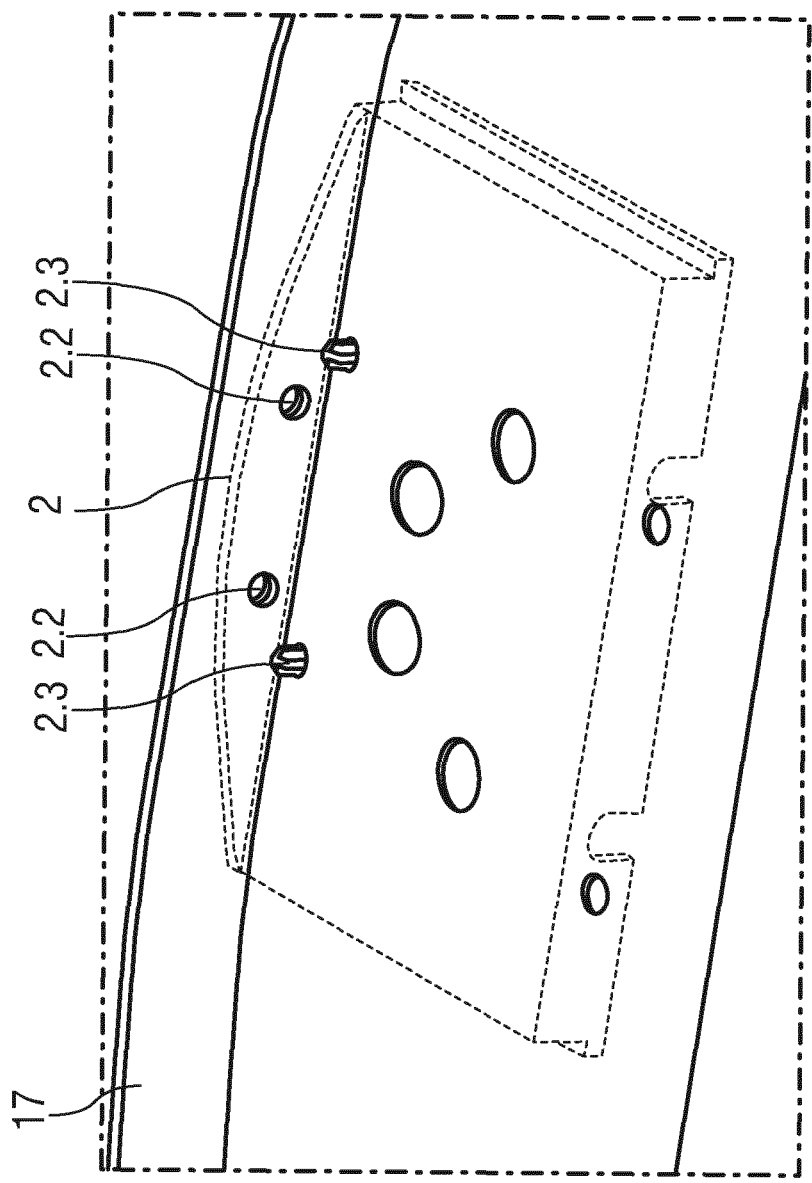
FIG. 12 is a schematic view of a partially mounted base plate on a seat structure.

FIGS. 11 and 12 show the base plate 2 in a loosely pre-positioned location in which the base plate 2 is pre-positioned via the domes 2.3 on the base plate 2. Subsequently, the base plate 2 is fastened by means of screws 16 to the seat structure 17. To this end, the base plate 2 is positioned and arranged on the domes 2.3 in the Z-direction onto the seat structure 17, for example a seat frame or a seat plate or seat shell. As a result, a pre-centering is carried out by the domes 2.3. Subsequently, the base plate 2 is screwed by means of screws 16 to the seat structure 17 through the through-bores 2.2. As a result, a fastening of the base plate 2 and the seat structure 17 is possible with zero backlash. The Z-direction in this case refers, as in the case of the X direction and the Y-direction, to the three-dimensional coordinate system shown, wherein the Z-direction is the vertical direction and the X-direction corresponds to the direction of displacement L.

Figure 13:
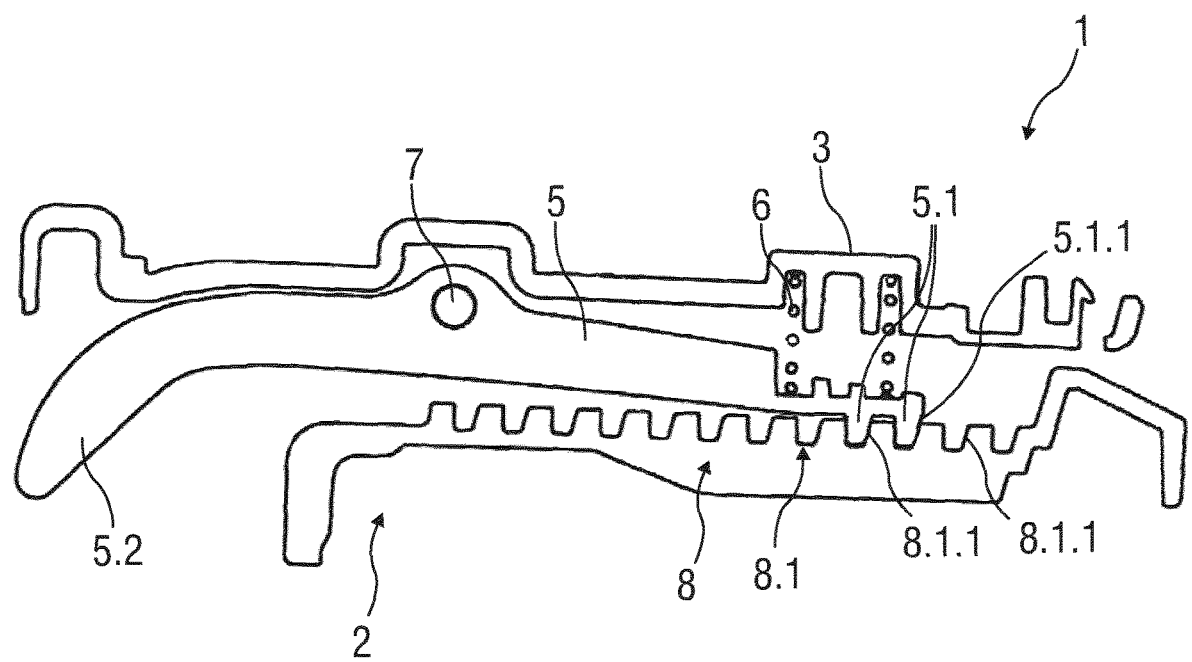
FIG. 13 is a further schematic view showing a seat depth adjuster.

FIG. 13 shows a schematic view of a further embodiment of the seat depth adjuster 1 in the locked and partially extended state. The unlocking lever 5 comprises the resetting element 6 which is configured as a compression spring. Additionally, in the example shown here, the unlocking lever 5 has two locking teeth 5.1. The respective locking tooth 5.1 is latched into one of the respective latching receivers 8.1. The unlocking lever 5 is held in the locked position by means of the resetting elements 6.

By the embodiment shown here of the respective locking tooth 5.1 and the latching receivers 8.1, optimized behavior is achieved during an accident, i.e. during a collision of the vehicle with an obstacle, in particular during a rear-end collision. To this end, the at least one locking tooth 5.1 or, as in the example shown here, the plurality of locking teeth 5.1 and the latching receivers 8.1 are configured such that, for example due to a collision, in particular due to a rear-end collision, an automatic unlocking and a retraction of the seat depth adjuster 1, i.e. a displacement of the carrier plate 3 into the retracted position is permitted, but exclusively into the retracted position. In other words, if the carrier plate 3 were to be moved in the opposing direction, the at least one locking tooth 5.1 or the plurality of locking teeth 5.1 would be immediately latched again.

Since, therefore, for example during an accident, an automatic, deliberate and controlled displacement of the carrier plate 3 into the retracted position is permitted and an inadvertent and an uncontrolled displacement into the extended position is prevented, the risk of injury is reduced. The at least one locking tooth 5.1 or the plurality of locking teeth 5.1 and the latching receivers 8.1 thus expediently have such a tooth geometry and the seat depth adjuster 1 is expediently configured such that, in particular in the case of a rear-end collision, due to a resulting defined introduction of force via the vehicle occupants, the deliberate and controlled automatic unlocking and retraction of the seat depth adjuster 1, i.e. the deliberate and controlled displacement of the carrier plate 3 into the retracted position, is possible.

An advantageous tooth geometry which permits this is shown in FIG. 13. A rear tooth flank 5.1.1 of the respective locking tooth 5.1 and a rear latching receiver flank 8.1.1 of the respective latching receivers 8.1 are configured to be beveled, in particular beveled so as to correspond to one another. The bevels are configured such that with a corresponding action of force on the carrier plate 3 in the retraction direction, i.e. in the direction of displacement L in the direction of the retracted position, via the bevels, i.e. via the corresponding beveled flanks 5.1.1, 8.1.1, the respective locking tooth 5.1 is forced out of the respective latching receiver 8.1 counter to the action of restoring force of the resetting element 6, so that the seat adjuster 1 is unlocked and the carrier plate 3 moves into the retracted position due to the action of force.

In order to permit this, the rear latching receiver flanks 8.1.1 of the latching receivers 8.1, i.e. the latching receiver flanks 8.1.1 facing in the direction of the retracted position, are beveled such that an opening cross section of the latching receivers 8.1 is increasingly enlarged from one respective latching receiver base to one respective latching receiver upper face. In other words, the rear latching receiver flanks are inclined to the rear, from the latching receiver base in the direction of the retracted position. The rear locking tooth flanks 5.1.1 are correspondingly inclined, i.e. the respective rear locking tooth flank 5.1.1 is inclined such that one respective locking tooth cross section, from a locking tooth base facing the respective latching receiver base, is increasingly enlarged upwardly, i.e. in the direction of the unlocking lever 5.

While specific embodiments of the invention have been shown and described in detail to illustrate the application of the principles of the invention, it will be understood that the invention may be embodied otherwise without departing from such principles.

The invention claimed is:

1. A seat depth adjuster for a vehicle seat, the depth seat adjuster comprising:
    a base plate which is connectable to a seat structure of the vehicle seat and which comprises a latching unit;
    a carrier plate which is arranged above the base plate and which is displaceable relative to the base plate;
    a locking unit which is releasably latched in the latching unit; and
    a drive unit which acts on the carrier plate in the direction of displacement, wherein;
    the carrier plate is fixed relative to the base plate in a latched position of the locking unit and is displaceable between a retracted position and an extended position in a released position of the locking unit and the drive unit causes a displacement of the carrier plate into the extended position, in the released position of the locking unit;
    the latching unit is arranged on an upper face of the base plate, facing the carrier plate, and comprises latching receivers which are offset in the direction of displacement;
    the locking unit comprises an unlocking lever with at least one locking tooth which engages in one of the latching receivers in a latched manner in the latched position;
    the latching receivers are open upwardly and the at least one locking tooth is oriented downwardly;
    the at least one locking tooth is arranged on the unlocking lever such that a free end of the at least one locking tooth is arranged below a second, opposing end region of the locking tooth, by which the locking tooth is arranged or configured on the unlocking lever; and
    the at least one locking tooth is moveable upwardly out of the respective latching receiver for unlocking and the at least one locking tooth is moveable downwardly into the respective latching receiver for locking.

2. The seat depth adjuster as claimed in claim 1, further comprising at least one resetting element which acts on the locking unit toward the latched position.

3. The seat depth adjuster as claimed in claim 1, wherein the unlocking lever with an actuating unit, which is coupled in an articulated manner, is movable between the latched position and the released position.

4. The seat depth adjuster as claimed in claim 3, wherein the actuating unit and the unlocking lever are configured and arranged such that for moving the unlocking lever the actuating unit acts on an end region of the unlocking lever remote from at least one locking tooth.

5. The seat depth adjuster as claimed in claim 1, wherein the unlocking lever is pivotably mounted about an axle.

6. The seat depth adjuster as claimed in claim 1, wherein the drive unit comprises at least one spring element which acts between the base plate and the carrier plate.

7. The seat depth adjuster as claimed in claim 6, wherein the at least one spring element is configured as a tension spring or as a compression spring.

8. The seat depth adjuster as claimed in claim 1, wherein the base plate comprises through-bores, for receiving fastening elements for fixing the base plate to the seat structure, and domes which protrude vertically from a base plate lower face.

9. A method for mounting a seat depth adjuster, the method comprising the steps of:
    providing the depth seat adjuster comprising a base plate which is connectable to a seat structure of the vehicle seat and which comprises a latching unit, a carrier plate which is arranged above the base plate and which is displaceable relative to the base plate, a locking unit which is releasably latched in the latching unit and a drive unit which acts on the carrier plate in the direction of displacements wherein the carrier plate is fixed relative to the base plate in a latched position of the locking unit and is displaceable between a retracted position and an extended position in a released position of the locking unit and the drive unit causes a displacement of the carrier plate into the extended position, in the released position of the locking unit, the latching unit is arranged on an upper face of the base plate, facing the carrier plate, and comprises latching receivers which are offset in the direction of displacement and the locking unit comprises an unlocking lever with at least one locking tooth which engages in one of the latching receivers in a latched manner in the latched position, the latching receivers being open upwardly and the at least one locking tooth is oriented downwardly, the at least one locking tooth being arranged on the unlocking lever such that a free end of the at least one locking tooth is arranged below a second, opposing end region of the locking tooth, by which the locking tooth is arranged or configured on the unlocking lever, the at least one locking tooth being moveable upwardly out of the respective latching receiver for unlocking and the at least one locking tooth is moveable downwardly into the respective latching receiver for locking;
    providing the base comprising through-bores, for receiving fastening elements for fixing the base plate to the seat structure, and domes which protrude vertically from a base plate lower face;
    positioning the base plate onto the seat structure in a vertical Z-direction with a pre-positioning by means of the domes; and
    fixing the base plate by the fastening elements to the seat structure.

10. The method as claimed in claim 9, wherein the free end of the at least one locking tooth and the second, opposing end region of the locking tooth face in a direction of the upper face of the base plate.

11. The method as claimed in claim 9, wherein the free end of the at least one locking tooth and the second, opposing end region of the locking tooth face a direction away from the carrier plate.

12. The method as claimed in claim 9, wherein the carrier plate comprises a lower surface facing in a direction of the upper face of the base plate, the latching receivers facing in a direction of the lower surface of the carrier element.

13. The method as claimed in claim 9, wherein the unlocking lever comprises an unlocking lever portion extending in an interior space defined by the base plate and the carrier plate, the unlocking lever portion comprising an unlocking lever end portion, the at least one tooth extending from the unlocking lever end portion, wherein the unlocking lever end portion is located at a first position when the at least one locking tooth engages in the one of the latching receivers and the unlocking lever end portion is located at a second position when the at least one locking tooth is located at a spaced location from the one of the latching receivers, wherein a distance between the first position and the carrier plate is greater than a distance between the second position and the carrier plate.

14. The seat depth adjuster as claimed in claim 1, wherein the free end of the at least one locking tooth and the second, opposing end region of the locking tooth face in a direction of the upper face of the base plate.

15. The seat depth adjuster as claimed in claim 1, wherein the free end of the at least one locking tooth and the second opposing end region of the locking tooth face a direction away from the carrier plate.

16. The seat depth adjuster as claimed in claim 1, wherein the carrier plate comprises a lower surface facing in a direction of the upper face of the base plate, the latching receivers facing in a direction of the lower surface of the carrier element.

17. The seat depth adjuster as claimed in claim 1, wherein the unlocking lever comprises an unlocking lever portion extending in an interior space defined by the base plate and the carrier plate, the unlocking lever portion comprising an unlocking lever end portion, the at least one tooth extending from the unlocking lever end portion, wherein the unlocking lever end portion is located at a first position when the at least one locking tooth engages in the one of the latching receivers and the unlocking lever end portion is located at a second position when the at least one locking tooth is located at a spaced location from the one of the latching receivers, wherein a distance between the first position and the carrier plate is greater than a distance between the second position and the carrier plate.

18. The seat depth adjuster as claimed in claim 17, further comprising an actuating unit connected to the unlocking lever, wherein the unlocking lever is actuated via the actuating unit.

19. A seat depth adjuster for a vehicle seat, the depth seat adjuster comprising:
   a base plate which is connectable to a seat structure of the vehicle seat and which comprises a latching unit;
   a carrier plate which is arranged above the base plate and which is displaceable relative to the base plate;
   a locking unit which is releasably latched in the latching unit; and
   a drive unit which acts on the carrier plate in the direction of displacement, wherein:
   the carrier plate is fixed relative to the base plate in a latched position of the locking unit and is displaceable between a retracted position and an extended position in a released position of the locking unit and the drive unit causes a displacement of the carrier plate into the extended position, in the released position of the locking unit;
   the latching unit is arranged on an upper face of the base plate, facing the carrier plate, and comprises latching receivers which are offset in the direction of displacement;
   the locking unit comprises an unlocking lever with at least one locking tooth which engages in one of the latching receivers in a latched manner in the latched position;
   the drive unit comprises at least one spring element which acts between the base plate and the carrier plate.

20. The seat depth adjuster as claimed in claim 19, wherein the at least one spring element is configured as a tension spring or as a compression spring.

* * * * *